(12) United States Patent
Inagaki et al.

(10) Patent No.: US 10,941,244 B2
(45) Date of Patent: *Mar. 9, 2021

(54) POLYESTER FILM

(71) Applicants: TOYOBO CO., LTD., Osaka (JP); Furanix Technologies B.V., Amsterdam (NL)

(72) Inventors: Jun Inagaki, Otsu (JP); Katsuya Ito, Otsu (JP); Yukihiro Numata, Otsu (JP); Shota Hayakawa, Otsu (JP); Jesper Gabriel Van Berkel, Amsterdam (NL)

(73) Assignees: TOYOBO CO., LTD., Osaka (JP); Furanix Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/089,693

(22) PCT Filed: Mar. 7, 2017

(86) PCT No.: PCT/JP2017/008902
§ 371 (c)(1),
(2) Date: Sep. 28, 2018

(87) PCT Pub. No.: WO2017/169553
PCT Pub. Date: Oct. 5, 2017

(65) Prior Publication Data
US 2019/0106534 A1  Apr. 11, 2019

(30) Foreign Application Priority Data
Mar. 30, 2016  (JP) ................ 2016-068297

(51) Int. Cl.
*B32B 7/02* (2019.01)
*C08G 63/199* (2006.01)
(Continued)

(52) U.S. Cl.
CPC .......... *C08G 63/199* (2013.01); *B29C 55/005* (2013.01); *B29C 55/16* (2013.01);
(Continued)

(58) Field of Classification Search
CPC ....... B29C 55/005; B29C 55/16; B29C 71/02; B29K 2067/00; B29L 2007/008;
(Continued)

(56) References Cited

U.S. PATENT DOCUMENTS 2,551,731 A  5/1951  Drewitt et al.
4,439,479 A  3/1984  Kanai et al.
(Continued)

FOREIGN PATENT DOCUMENTS

CN  101899145 A  12/2010
CN  101959941 A  1/2011
(Continued)

OTHER PUBLICATIONS

European Patent Office, International Search Report in International Patent Application No. PCT/JP2016/003976 dated Nov. 23, 2016.
(Continued)

*Primary Examiner* — Lawrence D Ferguson
(74) *Attorney, Agent, or Firm* — Leydig, Voit & Mayer, Ltd.

(57) ABSTRACT

It is provided that a polyester film excellent in heat resistant dimension stability, impact-resistant strength properties, easy-slipping properties, mechanical properties, transparency, and gas barrier performance, and a film roll obtained by winding up this polyester film. A polyester film includes at least one layer mainly including a polyester resin containing a dicarboxylic acid component including furandicarboxylic acid as a main component and a glycol component including ethylene glycol as a main component; and the polyester film has a plane orientation coefficient ΔP of not
(Continued)

less than 0.005 and not more than 0.200, a thickness of not less than 1 µm and not more than 300 µm, a heat shrinkage rate of 3.2% or less in each of the MD direction and the TD direction at 150° C. for 30 minutes, and a layer containing at least one additive.

20 Claims, 1 Drawing Sheet

(51) Int. Cl.
| | |
|---|---|
| C08J 5/18 | (2006.01) |
| B29C 55/00 | (2006.01) |
| B29C 55/16 | (2006.01) |
| B29C 71/02 | (2006.01) |
| B29K 67/00 | (2006.01) |
| B29L 7/00 | (2006.01) |

(52) U.S. Cl.
CPC ............... *B29C 71/02* (2013.01); *C08J 5/18* (2013.01); *B29K 2067/00* (2013.01); *B29L 2007/008* (2013.01); *C08J 2367/02* (2013.01)

(58) Field of Classification Search
CPC . C08G 63/199; C08J 2367/02; C08J 2433/04; C08J 2467/02; C08J 2475/04; C08J 5/18; C08J 7/047
See application file for complete search history.

(56) References Cited

U.S. PATENT DOCUMENTS

| | | | |
|---|---|---|---|
| 5,096,784 | A | 3/1992 | Culbertson et al. |
| 5,128,206 | A | 7/1992 | Fiard et al. |
| 6,254,996 | B1 | 7/2001 | Fukuda et al. |
| H1982 | H | 8/2001 | Dunn et al. |
| 10,407,555 | B2 | 9/2019 | Inagaki et al. |
| 2004/0146724 | A1 | 7/2004 | Peiffer et al. |
| 2005/0100723 | A1 | 5/2005 | Tanaka et al. |
| 2008/0038539 | A1 | 2/2008 | Yokota et al. |
| 2009/0124763 | A1 | 5/2009 | Matsuda et al. |
| 2012/0053317 | A1 | 3/2012 | Matsumura et al. |
| 2012/0207956 | A1 | 8/2012 | Matsuda et al. |
| 2012/0258299 | A1 | 10/2012 | Matsuda et al. |
| 2012/0288692 | A1 | 11/2012 | Broyles et al. |
| 2012/0288693 | A1 | 11/2012 | Stanley et al. |
| 2013/0011631 | A1 | 1/2013 | Sakellarides et al. |
| 2014/0004286 | A1 | 1/2014 | Sakellarides et al. |
| 2014/0099455 | A1 | 4/2014 | Stanley et al. |
| 2014/0363546 | A1 | 12/2014 | Zhou et al. |
| 2015/0004387 | A1 | 1/2015 | Sargeant et al. |
| 2015/0119548 | A1 | 4/2015 | Takahashi et al. |
| 2015/0141584 | A1 | 5/2015 | Saywell et al. |
| 2015/0307704 | A1 | 10/2015 | Bhattacharjee et al. |
| 2015/0343746 | A1 | 12/2015 | Bhattacharjee et al. |
| 2015/0353692 | A1 | 12/2015 | Bhattacharjee et al. |
| 2016/0002395 | A1 | 1/2016 | Matsuda et al. |
| 2016/0108171 | A1 | 4/2016 | Haruta et al. |
| 2016/0200862 | A1 | 7/2016 | Bastioli et al. |
| 2016/0319066 | A1 | 11/2016 | Shimoharai et al. |
| 2017/0297256 | A1 | 10/2017 | Kolstad et al. |
| 2018/0170019 | A1 | 6/2018 | Fayet et al. |
| 2018/0244878 | A1 | 8/2018 | Inagaki et al. |
| 2018/0311939 | A1 | 11/2018 | Larrieu et al. |
| 2019/0366616 | A1 | 12/2019 | Berny et al. |
| 2019/0389189 | A1 | 12/2019 | Hayakawa et al. |
| 2020/0269559 | A1 | 8/2020 | Inagaki et al. |
| 2020/0269560 | A1 | 8/2020 | Inagaki et al. |

FOREIGN PATENT DOCUMENTS

| | | | |
|---|---|---|---|
| CN | 104053535 | A | 9/2014 |
| EP | 2511320 | A1 | 10/2012 |
| JP | H11-010725 | A | 1/1999 |
| JP | 2000-119414 | A | 4/2000 |
| JP | 2001-232739 | A | 8/2001 |
| JP | 2001-342267 | A | 12/2001 |
| JP | 2002-370277 | A | 12/2002 |
| JP | 2003-071969 | A | 3/2003 |
| JP | 2003-200546 | A | 7/2003 |
| JP | 2007-118476 | A | 5/2007 |
| JP | 4881127 | B2 | 2/2012 |
| JP | 2012-094699 | A | 5/2012 |
| JP | 2012-229395 | A | 11/2012 |
| JP | 2013-155389 | A | 8/2013 |
| JP | 2015-157411 | A | 9/2013 |
| JP | 2014-043571 | A | 3/2014 |
| JP | 2014-073598 | A | 4/2014 |
| JP | 2015-506389 | A | 3/2015 |
| JP | 2015-098612 | A | 5/2015 |
| TW | 200951163 | A | 12/2009 |
| WO | WO 2012/142271 | A1 | 10/2012 |
| WO | WO 2013/097013 | A1 | 7/2013 |
| WO | 2014/100265 | A1 | 6/2014 |
| WO | WO 2014/100256 | A2 | 6/2014 |
| WO | WO 2014/100265 | A1 | 6/2014 |
| WO | WO 2015/093524 | A1 | 6/2015 |
| WO | WO 2016/032330 | A1 | 3/2016 |
| WO | 2016/123209 | A1 | 8/2016 |

OTHER PUBLICATIONS

Japanese Patent Office, Notification of Reasons for Refusal in Japanese Patent Application No. 2017-506943 dated Sep. 13, 2017.
Gandini et al., "The Furan Counterpart of Poly(ethylene terephthalate): An Alternative Material Based on Renewable Resources," *J. Polym. Sci. Part A: Polym. Chem.*, 47(1): 295-298 (2009).
European Patent Office, Extended European Search Report in European Patent Application No. 17774098.2 dated Nov. 8, 2019.
Hachihama et al., "Synthesis of Polyesters containing Furan Ring," *Technology Reports of the Osaka University*, 8(333): 475-480 (1958).
Japanese Patent Office, International Search Report in International Patent Application No. PCT/JP2017/008902 (dated May 16, 2017).
Australian Patent Office, Examination Report No. 1 in Australian Patent Application No. 2017242303 (dated Jun. 29, 2020).
Taiwan Intellectual Property Office, First Office Action in Taiwanese Patent Application No. 106107343 (dated Jun. 16, 2020).
Australian Patent Office, Examination Report in Australian Patent Application No. 2016381909 (dated May 5, 2020).
European Patent Office, Extended European Search Report in European Patent Application No. 16881712.0 (dated Jun. 26, 2019).
China National Intellectual Property Administration, First Office Action in Chinese Patent Application No. 201680076574.4 (dated Aug. 21, 2019) English translation.
China National Intellectual Property Administration, First Office Action in Chinese Patent Application No. 201680076573.X (dated Aug. 30, 2019) English translation.
China National Intellectual Property Administration, the Second Office Action in Chinese Patent Application No. 201680076574.4 (dated Mar. 16, 2020) English translation.
Indian Patent Office, Examination Report in Indian Patent Application No. 201847027693 (dated May 15, 2020).
Japanese Patent Office, International Search Report in International Patent Application No. PCT/JP2016/088617 (dated Mar. 21, 2017) English translation.
Japanese Patent Office, International Search Report in International Patent Application No. PCT/JP2016/088618 (dated Mar. 21, 2017) English translation.
Japanese Patent Office, International Search Report in International Patent Application No. PCT/JP2018/007405 (dated May 29, 2018) English translation.
Taiwan Intellectual Property Office, First Office Action in Taiwanese Patent Application No. 105143160 (dated Apr. 27, 2020) English translation.
Taiwan Intellectual Property Office, First Office Action in Taiwanese Patent Application No. 105143162 (dated Apr. 27, 2020) English translation.

(56) References Cited

OTHER PUBLICATIONS

U.S. Appl. No. 15/756,909 filed Mar. 1, 2018, Patented.
U.S. Appl. No. 16/066,212 filed Jun. 26, 2018, Pending.
U.S. Appl. No. 16/066,232 filed Jun. 26, 2018, Pending.
U.S. Appl. No. 16/490,307 filed Aug. 30, 2019, Pending.
China National Intellectual Property Administration, Rejection Decision in Chinese Patent Application No. 201680076574.4 (dated Aug. 24, 2020) English translation.
European Patent Office, Communication Pursuant to Article 94(3) EPC in European Patent Application No. 16881711.2 (dated Nov. 4, 2020).
China National Intellectual Property Administration, First Office Action in Chinese Patent Application No. 201780021682.6 (dated Dec. 4, 2020) English translation.
China National Intellectual Property Administration, First Office Action in Chinese Patent Application No. 201880015127.7 (dated Oct. 22, 2020) English translation.
European Patent Office, Extended European Search Report in European Patent Application No. 18760798.1 (dated Dec. 8, 2020).
Japanese Patent Office, Notice of Reasons for Refusal in Japanese Patent Application No. 2017-559174 (dated Jan. 19, 2021) English translation.
Japanese Patent Office, Notice of Reasons for Refusal in Japanese Patent Application No. 2017-559175 (dated Jan. 19, 2021) English translation.

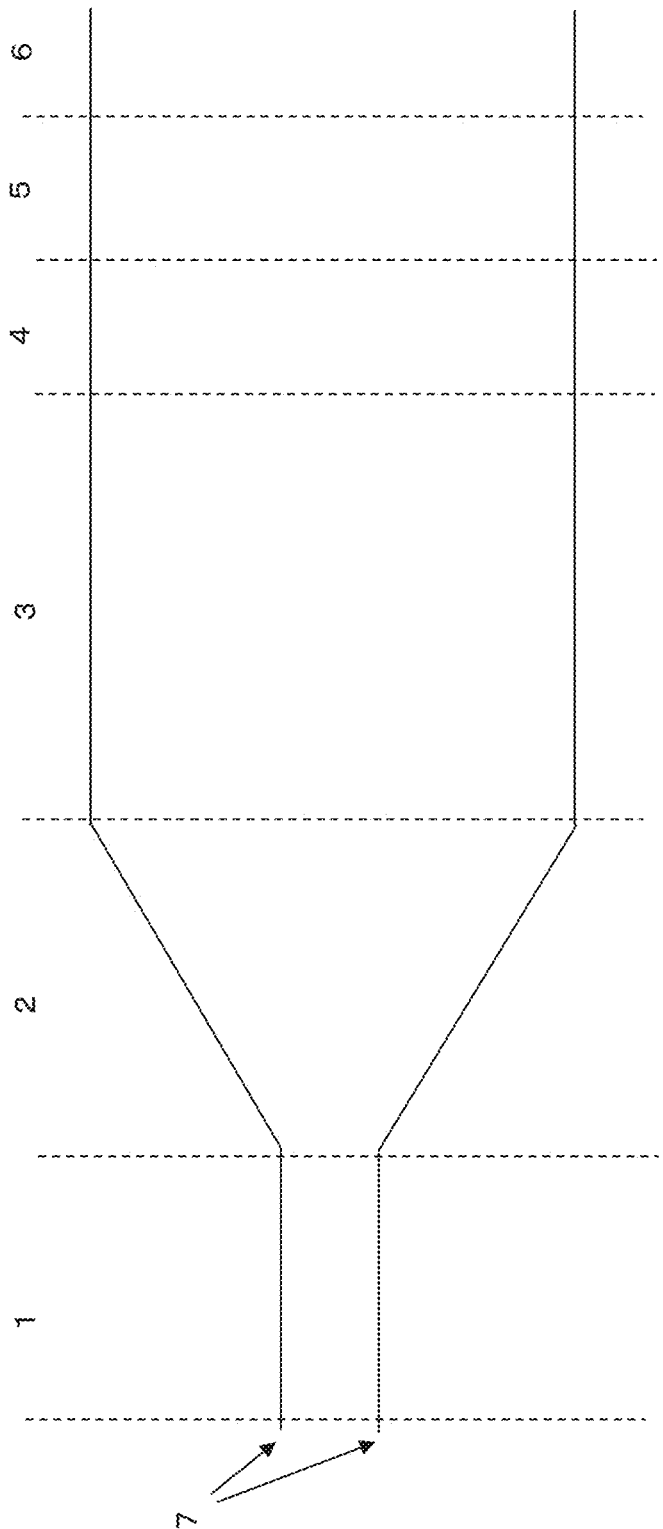

POLYESTER FILM

CROSS-REFERENCE TO RELATED APPLICATIONS

This patent application is the U.S. national phase of International Patent Application No. PCT/JP2017/008902, filed Mar. 7, 2017, which claims the benefit of Japanese Patent Application No. 2016-068297, filed on Mar. 30, 2016, which are incorporated by reference in their entireties herein.

TECHNICAL FIELD

The present invention relates to a polyester film having a furandicarboxylic acid unit. Specifically, the present invention relates to a polyester film excellent in heat resistant dimension stability, impact-resistant strength properties, easy-slipping properties, mechanical properties, transparency, and gas barrier performance.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packing materials, and automobiles. Among plastic films, biaxially stretched PET films have been used widely for industrial and packing fields because of excellent balance between cost and mechanical strength, heat resistance, dimensional stability, chemical resistance, optical properties, etc.

In the field of industrial films, PET films can be used as functional films for flat panel displays (FPD) such as liquid crystal displays and plasma display because of having excellent transparency. Further, PET films provided with hydrolysis resistance have been used for films for solar cell back sheets and also used for various purposes such as functional films and base films.

In the field of packing films, PET films have been used for applications such as wrapping of foodstuff, shrink labels for bottles, and gas barrier films. Particularly, films excellent in gas barrier properties have been used as packing materials or gas shielding materials which are required to have airtightness for foodstuff, pharmaceutical products, electronic parts, and the like, and there has been a growing demand for such films in recent years.

On the other hand, resins having biodegradability and resins produced from biomass-derived raw materials have drawn attention as environmentally friendly-type or environmentally sustainable-type materials.

From the above-mentioned viewpoint, many investigations have been performed for the purpose of providing a reproducible polymer for replacing petroleum derivatives such as PET. It is known that furandicarboxylic acids (FDCA) is similar to terephthalic acid in terms of solubility in hot water and stability to acidic reagents and FDCA has a planar structure, therefore furan type materials obtained by polycondensation of FDCA and diols have been proposed (Patent Document 1 and Non-Patent Document 1).

Only the melting point in the physical properties of these polymers disclosed is made clear, and mechanical strength is unclear. It is unknown whether or not thermoplastic resin compositions containing a furandicarboxylic acid unit can be used in the fields of industrial and packing films.

Polymer compounds usable for electric and electronic parts or the like by specifying the degree of polymerization have been proposed for thermoplastic resin compositions containing, mainly polybutylene furandicarboxylate (PBF), some kinds of furandicarboxylic acid units (Patent Document 2). Further, polyesters excellent in mechanical strength by specifying reduced viscosity and terminal acid value have been proposed (Patent Documents 3 and 4).

However, thermally press-molded products of PBF disclosed in Patent Document 2 have low transparency and are thus limited for uses in the fields of industrial and packing films. In the mechanical properties of 200 μm sheet products having a furandicarboxylic acid structure disclosed in Patent Documents 3 and 4, both breaking elongation and breaking strength are low and it is not conceivable to use such sheet products in the fields of industrial and packing films.

Sheets obtained from polyethylene furandicarboxylate (PEF), PEF derivatives and blends of PEF derivatives and copolymer polyesters have been investigated to be formed into uniaxially stretched films (Patent Documents 5 and 6).

Patent Document 5 discloses that as compared with a sheet made of a thermoplastic resin composition containing a furandicarboxylic acid unit, a film obtained by uniaxially stretching the sheet to 5 to 16 times is improved in breaking elongation, depending on the kinds of blends and the blending ratio of furandicarboxylic acid. However, no significant improvement in breaking elongation is confirmed unless cyclohexanedimethanol-copolymerized PET, which is widely known for improving breaking elongation, is blended. It must be said that the effect is limited depending on the blending ratio and the film has not been used so far in the fields of industrial and packing films.

Patent Document 6 discloses a PET film uniaxially stretched about 1.6 times by using rolling rolls. The film is shown to be a plastic film excellent in gas barrier properties, but it merely mentions the advantages of barrier properties derived from chemical structure of PEF, and mechanical strength which is important for packing materials is not made clear, so that the film has not been used so far in the field of gas barrier film containing a furandicarboxylic acid unit for packing.

CITATION LIST

Patent Document

[Patent Document 1] U.S. Pat. No. 2,551,731
[Patent Document 2] Japanese Patent No. 4881127
[Patent Document 3] JP-A-2013-155389
[Patent Document 4] JP-A-2015-098612
[Patent Document 5] JP-T-2015-506389
[Patent Document 6] JP-A-2012-229395

Non Patent Document

[Non-Patent Document 1] Y. Hachihama, T. Shono, and K. Hyono, Technol. Repts. Osaka Univ., 8, 475 (1958)

SUMMARY OF INVENTION

Technical Problem

Currently, the resin compositions each containing a furandicarboxylic acid proposed in the above-mentioned patent documents have been investigated for replacing PET. But because of inferior mechanical properties, the resin compositions cannot be used for industrial and packing films. Further, no investigation is performed on heat resistance and transparency, and it is unknown whether or not the resin compositions are applicable in the fields of industrial and packing films. It has been difficult to produce a film small in dimension change during thermal processing such as printing or lamination.

Further, a barrier film excellent in easy-slipping properties has been required from the viewpoint of continuous processability in the processing of food-packing materials. Additionally, a barrier film has been required in which easy-slipping properties are highly compatible with transparency from the viewpoint of the detection of foreign matters in product examination of a food-packed product, and design which consumers require.

Furthermore, a material has been required which is excellent in continuous productivity in post-processing such as printing or lamination, which is continuously processable in a roll-to-roll manner, and which is favorably usable for packing foods, medicines, electronic members, and the like.

Additionally, awareness of environmental issues has been becoming higher, and accordingly, demands for films including a biomass-derived material have been increasing.

An object of the present invention is to provide a polyester film having a furandicarboxylic acid unit originating from biomass, and excellent in heat resistant dimension stability, impact-resistant strength properties, easy-slipping properties, mechanical properties, transparency, and gas barrier performance. Another object of the invention is to provide a film roll obtained by winding up this polyester film.

Solution to Problem

Specifically, the film of the present invention is (1) a polyester film comprising at least one layer mainly including a polyester resin containing a dicarboxylic acid component including furandicarboxylic acid as a main component and a glycol component including ethylene glycol as a main component; and having a plane orientation coefficient ΔP of not less than 0.005 and not more than 0.200, a thickness of not less than 1 μm and not more than 300 μm, a heat shrinkage rate of 3.2% or less in each of the MD direction and the TD direction at 150° C. for 30 minutes, and a layer containing at least one additive.

(2) It is preferable that the polyester film according to (1), wherein the plane orientation coefficient ΔP is not less than 0.100 and not more than 0.160.

(3) It is preferable that the polyester film according to (1) or (2), wherein the additive is fine particles.

(4) It is preferable that the polyester film according to any one of (1) to (3), which has an impact strength calculated in 15 μm equivalent of 0.4 J or more.

(5) It is preferable that a polyester film roll obtained by winding up the polyester film as recited in any one of (1) to (4).

(6) Additionally, the present invention also encompasses a method for producing the polyester film as recited in any one of (1) to (4), the method comprising the steps of; stretching an unstretched film in a mechanical direction and a transverse direction, passing the film through a highest-temperature part in a heat fixation treatment, and separating an end portion of the film immediately after the film has been passed through the highest-temperature part; and the step of subjecting the resultant film to a relaxation heat treatment in the mechanical direction and the transverse direction.

Effects of Invention

A polyester film having a furandicarboxylic acid unit is excellent in thermal dimension stability, so that the film is favorably usable as a film for industries or packing. According to preferred embodiments, the film is also excellent in easy-slipping property and impact-resistant strength properties, so that the film can provide a packing material for, e.g., foods, medicines, and electronic elements, or a gas blocking material.

BRIEF DESCRIPTION OF THE DRAWING

FIG. 1 is an example of a plan view showing a transverse stretching step in a film-forming apparatus used in the present invention.

DESCRIPTION OF EMBODIMENTS

The polyester film of the present invention may have a coating layer. The coating layer is formed onto at least one surface of the polyester film. A thin film layer may be formed onto at least one surface of the polyester film onto which a coating layer is laminated.

<Polyester Film>

The polyester film used in the present invention is a biaxially oriented polyester film comprising a polyethylene furandicarboxylate-based resin containing mainly furandicarboxylic acid as a dicarboxylic acid component, and containing mainly ethylene glycol as a glycol component. The polyethylene furandicarboxylate-based resin contains, as main constituent components, ethylene glycol, and furandicarboxylic acid. The term "mainly" denotes that furandicarboxylic acid is contained in a proportion of 80% by mol or more based on 100% by mol of the dicarboxylic acid component(s), and ethylene glycol is contained in a proportion of 80% by mol or more based on 100% by mol of the glycol component(s).

As far as the object of the present invention is not hindered, a different dicarboxylic acid component and a different glycol component may be copolymerized with the main constituent components. The copolymerization amount proportion of the different dicarboxylic acid component and that of the different glycol component are each less than 20% by mol, preferably 10% by mol or less, in particular preferably 5% by mol or less based on the total amount of the dicarboxylic acid component(s) or the total amount of the glycol component(s).

Examples of the different dicarboxylic acid component include aromatic dicarboxylic acids such as terephthalic acid, isophthalic acid, phthalic acid, naphthalene dicarboxylic acid, 4,4'-dicarboxybiphenyl, and sodium 5-sulfoisophthalic acid; alicyclic dicarboxylic acids such as 1,4-cyclohexane dicarboxylic acid, 1,3-cyclohexane dicarboxylic acid, 1,2-cyclohexane dicarboxylic acid, 2,5-norbornene dicarboxylic acid, and tetrahydrophthalic acid; and aliphatic dicarboxylic acids such as oxalic acid, malonic acid, succinic acid, adipic acid, azelaic acid, sebacic acid, undecanoic diacid, dodecanoic diacid, octadecanoic diacid, fumaric acid, maleic acid, itaconic acid, mesaconic acid, citraconic acid, and dimer acid.

Examples of the different glycol component include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; alicyclic glycols such as bisphenol A, bisphenol S, bisphenol C, bisphenol Z, bisphenol AP, ethylene oxide adducts or propylene oxide adducts of 4,4'-biphenol, 1,2-cyclohexanedimethanol, 1,3-cyclohexanedimethanol, and 1,4-cyclohexanedimethanol; and polyethylene glycol and polypropylene glycol.

The method for polymerization into such a polyethylene furandicarboxylate-based resin may be any production method, such as a direct polymerization method of allowing furandicarboxylic acid and, if necessary, the different dicarboxylic acid to react with ethylene glycol and, if necessary, the different glycol component; or an interesterification method of allowing a dimethyl ester of furandicarboxylic acid (and, if necessary, a methyl ester of the different dicarboxylic acid) and ethylene glycol (and, if necessary, the different glycol component) to undergo an interesterification reaction.

The polyester film used in the present invention may contain, as a resin component, polyamide, polystyrene, polyolefin or the like that is different from the polyethylene furandicarboxylate-based resin. From the viewpoint of mechanical properties and heat resistance of the polyester film, the content of the different resin is preferably 30% by mass or less, more preferably 20% by mass or less, even more preferably 10% by mass or less, in particular preferably 5% by mass or less based on the total resin component(s) of the polyester film. The content is most preferably 0% by mass (the total resin component(s) of the polyester film are substantially the polyethylene furandicarboxylate-based resin).

The polyester film of the present invention has a layer containing at least one additive. The additive may be contained in the layer containing mainly the polyethylene furandicarboxylate-based resin, or may be contained in the coating layer.

When the additive is contained in the layer containing mainly the polyethylene furandicarboxylate-based resin, this layer may have a monolayered structure or multilayered structure. This layer may have a multilayered structure including a polyethylene furandicarboxylate-based resin layer containing, only in a surface layer, the additive. Such a film may have, for example, a multilayered structure (a/b/a) obtained by laminating surface layers (a) containing the additive onto both surfaces of a central layer (b) by a co-extruding method; or a structure (c/b/c) in which a central layer (c) and both surface layers each contain the additive and the respective additive concentrations in these layers are different from one another.

The polyester film should have a layer containing at least one additive, and thus the structure of the film is not particularly limited.

The additive used in the present invention is selected from the followings in accordance with a purpose of use: inactive particles such as fine particles, heat resistant polymeric particles, and crosslinked polymeric particles; and a fluorescent whitener, an ultraviolet preventing agent, an infrared absorbing colorant, a heat stabilizer, a surfactant, and an antioxidant. Two or more of such additives can be contained in the polyester film.

As the fine particles used in the present invention, any kind of fine particles is selectable. Examples thereof include inorganic particles of silica, calcium carbonate, barium sulfate, calcium sulfate, alumina, kaolinite, and talc; and other organic particles. From the viewpoint of transparency, preferred are silica particles, and particularly, amorphous silica because such particles are close in refractive index to the resin component.

The fine particles contained in the polyethylene furandicarboxylate-based resin preferably have an average particle diameter of from 1 to 10 µm, more preferably from 1.5 to 7 µm, and even more preferably from 2 to 5 µm. When the average particle diameter of the finer particles is 1.0 µm or more, it is favorably possible to give a surface an irregularity structure suitable for giving easy-slipping properties. On the other hand, when the average particle diameter of the fine particles is 10 µm or less, the polyester film favorably maintains a high transparency. The content of the insoluble particles in the polyester is desirably from 0.005 to 1.0% by mass, and is preferably from 0.008 to 0.5% by mass. When the content of the fine particles is 0.005% by mass or more, it is favorably possible to give a surface of the surface layer an irregularity structure suitable for giving easy-slipping properties. When the content of the fine particles is 1.0% by mass or less, the polyester film favorably maintains a high transparency.

As the ultraviolet absorbent used in the present invention, any kind of the ultraviolet absorbent is selectable. Examples thereof include organic ultraviolet absorbents such as benzotriazole-based compounds and benzophenone-based compounds; and inorganic ultraviolet absorbents such as zinc oxide, titanium oxide, and cerium oxide in the form of fine particles having a particle diameter of 0.2 µm or less. The absorbent should be selected for use from known ultraviolet absorbents in accordance with a purpose of use.

As the antioxidant used in the present invention, any kind of the antioxidant is selectable. Examples thereof include aromatic amine-based antioxidants and phenolic antioxidants. Examples of the stabilizer include phosphorus-containing stabilizers such as phosphoric acid-based stabilizers and phosphate acid ester-based stabilizers; sulfur-containing stabilizers; and amine-based stabilizers.

The polyethylene furandicarboxylate-based resin preferably has an intrinsic viscosity of not less than 0.30 dL/g and not more than 1.20 dL/g, more preferably not less than 0.55 dL/g and not more than 1.00 dL/g, even more preferably not less than 0.70 dL/g and not more than 0.95 dL/g. If the intrinsic viscosity is lower than 0.30 dL/g, the polyester film is easily torn. If the intrinsic viscosity is higher than 1.20 dL/g, pressure for filtration of the resin rises so that the resin is hard to be filtrated with a high precision, and is hard to be extruded through a filter. In addition, an effect of heightening the film in mechanical properties is saturated.

<Coating Layer>

When a coating layer is formed, the coating layer is formed onto at least one surface of the polyester film. The coating layer may be formed onto each of both surfaces of the polyester film. The polyester film may have a multilayer-laminated structure in which, a further coating layer is formed on the coating layer. For the purpose of attaining consistency between a high transparency and excellent easy-slipping properties, it is important to form a coating layer. When this coating layer is in the form of multilayer, it is preferred that particles that will be detailed later are contained, and it is more preferred that inorganic particles that will be detailed later are contained in a more outer-layer (that is opposite to the side of the polyester film).

The coating layer preferably contains at least one resin selected from a polyester resin, a urethane resin, and an acrylic resin. The polyester resin, urethane resin, or acrylic resin constituting the coating layer in the present invention has adhesiveness to the polyester film. These resins may be used singly, or two or more different resins may be used in combination, such as a combination of the polyester and urethane resins, the polyester and acrylic resins, or the urethane and acrylic resins.

(Polyester Resin)

When a copolymerized polyester is used as the polyester resin, it is preferred to contain an aromatic dicarboxylic acid component as the dicarboxylic acid component, and ethylene glycol and a branched glycol as the glycol component. Examples of the branched glycol include 2,2-dimethyl-1,3-propanediol (neopentyl glycol), 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, and 2,2-di-n-hexyl-1,3-propanediol.

A lower limit of a molar ratio of the branched glycol component to the total glycol component(s) is preferably 10% by mol, more preferably 20% by mol, even more preferably 30% by mol. On the other hand, an upper limit thereof is preferably 90% by mol, more preferably 80% by mol. If necessary, for example, diethylene glycol, propylene glycol, butanediol, hexanediol, or 1,4-cyclohexanedimethanol may be used together.

The aromatic dicarboxylic acid component is most preferably terephthalic acid, isophthalic acid, or furandicarboxylic acid. The aromatic dicarboxylic acid component may be composed only of terephthalic acid, isophthalic acid, and furandicarboxylic acid. A different aromatic dicarboxylic acid, particularly, an aromatic dicarboxylic acid such as diphenylcarboxylic acid or 2,6-naphthalenedicarboxylic acid may be added in a proportion of 10% by mol or less based on the total dicarboxylic acid component(s) for copolymerization.

When the polyester resin is used as an aqueous application liquid, a water soluble or water dispersible polyester-based resin is used. For the solubilization or dispersibility into water, it is preferred to undergo copolymerization with a compound having a sulfonate group or a compound having a carbonate group. It is preferred therefor to use, besides the dicarboxylic acid component, for example, sulfoterephthalic acid, 5-sulfoisophthalic acid, 4-sulfonaphthaleneisophthalic acid-2,7-dicarboxylic acid, 5-(4-sulfophenoxy)isophthalic acid, or an alkali metal salt thereof in a proportion ranging from 1 to 10% by mol based on the total dicarboxylic acid component(s) in order to give water dispersibility to the polyester. It is more preferred to use 5-sulfoisophthalic acid or an alkali metal salt thereof.

(Polyurethane Resin)

The polyurethane resin used in the present invention contains, as constituent components, at least a polyol component and a polyisocyanate component, and may optionally further contain a chain extender. When a thermally reactive polyurethane resin is used, the resin is, for example, a water soluble or water dispersible polyurethane in which terminated isocyanate groups are capped (referred to as blocked hereinafter) with active hydrogen groups.

Examples of the polyol component include polyester polyols obtained by a reaction of a polyvalent carboxylic acid (such as malonic acid, succinic acid, adipic acid, sebacic acid, fumaric acid, maleic acid, terephthalic acid or isophthalic acid) or an acid anhydride of the acid, and a polyhydric alcohol (such as ethylene glycol, diethylene glycol, triethylene glycol, propylene glycol, butanediol, 1,3-butanediol, 1,4-butanediol, 2,3-butanediol, neopentyl glycol, or 1,6-hexanediol); polyether polyols such as polyethylene glycol, polypropylene glycol, polyethylene propylene glycol, polytetramethylene ether glycol, and polyhexamethylene ether glycol; and polycarbonate polyols, polyolefin polyols, and acrylic polyols.

Examples of the polyisocyanate, which is a constituent component for the urethane resin in the present invention, include aromatic diisocyanates such as tolylene diisocyanate and diphenylmethane-4,4-diisocyanate; araliphatic diisocyanates such as xylylene diisocyanate; alicyclic diisocyanates such as isophorone diisocyanate, 4,4-dicyclohexylmethane diisocyanate, and 1,3-bis(isocyanatemethyl)cyclohexane; aliphatic diisocyanates such as hexamethylene diisocyanate and 2,2,4-trimethylhexamethylene diisocyanate; and polyisocyanates obtained by adding one or more of these compounds beforehand to, for example, trimethylolpropane. From the viewpoint of barrier performance, preferred are aromatic diisocyanates, araliphatic diisocyanates, and alicyclic diisocyanates. When the cyclic moiety has a substituent, a side chain of the aromatic ring or aliphatic ring is preferably a short chain. It is more preferred that the diisocyanate components are symmetric because the components are improved in cohesive power.

Examples of a blocking agent for the above-mentioned isocyanate group include bisulfites, phenols, alcohols, lactams, oximes, esters such as dimethyl malonate, diketones such as methyl acetoacetate, mercaptans, ureas, imidazoles, acid imides such as succinic imide, amines such as diphenylamine, imines, and carbamates such as 2-oxazolidine. The water soluble or water dispersible polyurethane preferably has, in its molecule, a hydrophilic group. It is preferred therefor that a compound to be used, which has in its molecule at least one active hydrogen atom, has a hydrophilic group, or that a hydrophilic compound is used as the above-mentioned blocking agent. Examples of the compound to be used, which has in its molecule at least one active hydrogen atom, include taurine, dimethylolpropionic acid, a polyester polyol having a carboxylic acid group or sulfonic acid group, and a polyoxyalkylene polyol. Examples of the hydrophilic compound as the blocking agent include bisulfites, and phenols having a sulfonic acid group. When thermal energy is given to the above-mentioned resin in a drying or thermal setting step in the production of the film, the blocking agent is released from the isocyanate groups. Thus, in the resin, the mixed water dispersible copolymerized polyester resin is fixed into a self-crosslinked network of the resin; and further the isocyanate groups react with terminated groups of the resin. The water soluble or water dispersible polyurethane is particularly preferably a polyurethane including a hydrophilic compound as the blocking agent. Such a polyurethane is poor in water resistance because the resin is hydrophilic while the resin is being prepared into an application liquid. However, when the polyurethane resin is applied, dried, and thermally set to complete the thermal reaction hydrophilic groups of the urethane resin, that is, the blocking agent is released to give an application film good in water resistance.

As the chemical composition, a urethane prepolymer used in the above-mentioned polyurethane resin is a compound which has a terminated isocyanate group and which is obtained by allowing the followings (1), (2) and (3) to react with one another: (1) a compound having, in its molecule, two or more reactive hydrogen atoms, and having a molecular weight of 200 to 20,000; (2) an organic polyisocyanate having, in its molecule, two or more isocyanate groups; and (3) a chain extender having, in its molecule, at least two active hydrogen atoms, this extender being optionally contained.

Examples of the generally known compound (1) having, in its molecule, two or more reactive hydrogen atoms, and having a molecular weight of 200 to 20,000 are compounds containing, in its terminal or molecule, two or more hydroxyl, carboxyl, amino, or mercapto groups. Particularly preferred example thereof includes a polyether polyol and a polyester polyol.

The polyester polyol can be obtained by condensing a polyvalent saturated or unsaturated carboxylic acid such as succinic acid, adipic acid, phthalic acid or maleic anhydride, or an anhydride of the carboxylic acid with the followings: a polyhydric saturated or unsaturated alcohol such as ethylene glycol, diethylene glycol, 1,4-butanediol, neopentyl glycol, 1,6-hexanediol or trimethylolpropane; a polyalkylene ether glycol such as polyethylene glycol or polypropylene glycol relatively low in molecular weight; or a mixture of two or more of these alcohols.

Furthermore, the followings may be used as the polyester polyol: polyesters obtained from a lactone and a hydroxy acid; and polyester polyols obtained by adding, e.g., ethylene oxide or propylene oxide to polyesters produced in advance.

Examples of (2) the organic polyisocyanate include isomers of toluylene diisocyanate, aromatic diisocyanates such as 4,4-diphenylmethane diisocyanate, araliphatic diisocyanates such as xylylene diisocyanate, alicyclic diisocyanates such as isophorone diisocyanate and 4,4-dicyclohexylmethane diisocyanate, aliphatic diisocyanates such as hexamethylene diisocyanate and 2,2,4-trimethylhexamethylene diisocyanate; and polyisocyanates obtained by adding one or more of these compounds to, e.g., trimethylolpropane.

Examples of (3) the chain extender having, in its molecule, at least two active hydrogen atoms include glycols such as ethylene glycol, diethylene glycol, 1,4-butanediol, and 1,6-hexanediol; polyhydric glycols such as glycerol, trimethylolpropane, and pentaerythritol; diamines such as ethylenediamine, hexamethylenediamine, and piperazine; amine alcohols such as monoethanolamine and diethanolamine; thiodiglycols such as thiodiethylene glycol; and water.

In the synthesis of the urethane prepolymer, a reaction is conducted under a temperature of 150° C. or lower, preferably a temperature from 70 to 120° C. for a period of 5 minutes to several hours by a single-stage or multi-stage isocyanate polyaddition method with the use of the (1) and the (2) and, if necessary, the (3). The ratio of the isocyanate groups of the (2) to the active hydrogen atoms of the (1) and the (3) may be selected at will as far as the ratio is 1 or more. It is however necessary that free isocyanate groups remain in the resultant urethane prepolymer. Furthermore, a content of the free isocyanate groups should be 10% by mass or less based on the total mass of the resultant urethane prepolymer. When taking into consideration the stability of an aqueous urethane prepolymer solution after the prepolymer is blocked, the content is preferably 7% by mass or less.

In the resultant prepolymer, terminated isocyanate groups are blocked preferably with a bisulfite. The urethane prepolymer is mixed with an aqueous bisulfite solution. Reaction is advanced while the mixture is sufficiently stirred for a period of about 5 minutes to 1 hour. The reaction temperature is preferably 60° C. or lower. Thereafter, the reaction mixture is diluted with water to be made into an appropriate concentration, so that a thermally reactive water-soluble urethane resin composition is obtained. This composition is adjusted into an appropriate concentration and viscosity when used. When the composition is heated to a temperature of about 80 to 200° C., the bisulfite serving as the blocking agent is usually disassociated to reproduce active terminated isocyanate groups, and therefore, the composition comes to have a property that a polyurethane polymer is produced or the isocyanate groups are added to other functional groups by a polyaddition reaction caused in the molecules of the prepolymer or between the molecules of the prepolymer.

(Acrylic Resin)

When the acrylic resin is used, examples of water soluble or water dispersible acrylic resin include acrylate resins and/or methacrylate resins; and copolymers made from these resins, and other aliphatic compound or aromatic compound which has an unsaturated bond and is copolymerizable with acrylic resin, such as styrene. An acryl-styrene copolymer resin excellent in hydrophilicity is most preferably a water dispersible acryl-styrene random copolymer resin obtained by emulsion polymerization.

(Particles)

In order to improve the polyester film in scratch resistance, and in handleability when the film is wound up into a roll form or unwound (such as slipping properties, traveling properties, blocking resistance, and air-releasing property of accompanying air at the time of the winding), it is preferred that the coating layer contains particles. This makes it possible that the laminated polyester film of the present invention gains slipping-properties, windability, and scratch resistance while keeping a high transparency.

Examples of the particles include inorganic particles, organic particles (heat resistant polymeric particles), or the like. Examples of the inorganic particles include inorganic particles such as calcium carbonate, calcium phosphate, amorphous silica, crystalline glass filler, kaolin, talc, titanium dioxide, alumina, silica-alumina composite oxide, barium sulfate, calcium fluoride, lithium fluoride, zeolite, molybdenum sulfide, and mica. Examples of the organic particles include heat resistant polymeric particles such as crosslinked polystyrene particles, crosslinked acrylic resin particles, crosslinked methyl methacrylate-based particles, benzoguanamine/formaldehyde condensed product particles, melamine/formaldehyde condensed product particles, and polytetrafluoroethylene particles.

Out of these particles, silica particles are preferred because the particles are relatively close in refractive index to the resin component(s) to easily give a highly transparent film. The shape of the particles is not particularly limited, and is preferably substantially spherical from the viewpoint of giving easy-slipping properties.

A content of the particles in the total amount of the coating layer is preferably 20% by mass or less, more preferably 15% by mass or less, in particular preferably 10% by mass or less. If the content of the particles in the coating layer is more than 20% by mass, the film is deteriorated in transparency and also becomes insufficient in adhesiveness easily. A lower limit of the content of the particles is preferably 0.1% by mass, more preferably 1% by mass, in particular preferably 3% by mass.

When the particles are of a single kind, or two or more kinds, main particles P preferably have an average particle diameter of from 10 to 10000 nm, in particular preferably from 200 to 1000 nm. If the average particle diameter of the particles P is less than 10 nm, the polyester film may be deteriorated in scratch resistance, slipping-properties, and windability. On the other hand, if the average particle diameter of the particles P is more than 10000 nm, the particles drop down easily and further the film tends to be raised in haze. When two or more kinds of the particles are used, and particles Q small in average particle diameter are secondarily added to the coating layer, the particles Q preferably have an average particle diameter of from 20 to 150 nm, more preferably from 40 to 60 nm. If the average particle diameter is less than 20 nm, it is hard for the film to obtain a sufficient blocking resistance, and further the film tends to be deteriorated in scratch resistance.

When the particles P are silica particles, it is preferred that the average particle diameter of the particles P is from 10 to 10000 nm because aggregates which are made of silica produced by a drying method and which have an average primary particle diameter of 40 to 60 nm do not drop easily from the coating layer. This would be because, in the step of forming the film, the particles can be made into a flat and stable shape through a stretching step and a heat fixation step after formation of the coating layer. From the viewpoint of the scratch resistance, the particles P are preferably particles in which the ratio of the average particle diameter in an aggregation state to the average primary particle diameter (average particle diameter in aggregation state/average primary particle diameter) is 4 times or more.

Regarding the particles, two or more kinds of different particles may be contained in the coating layer, or the same kind of particles having different average particle diameters may be contained in the coating layer.

A surfactant can be contained in the coating layer for the purpose of improving leveling properties of an application liquid for the layer when the liquid is coated, or defoaming the application liquid. The surfactant may be any of cationic, anionic, nonionic, and other surfactants. The surfactant is preferably a silicone-based, acetylene glycol-based, or fluorine-based surfactant. It is preferred that such a surfactant is contained in the application liquid for forming the coating layer to an extent that adhesiveness is not damaged between the coating layer and the polyester film, for example, in a proportion ranging from 0.005 to 0.5% by mass.

In order to give a different function to the coating layer, various additives may be added to the coating layer. Examples of the additives include a fluorescent dye, a fluorescent whitener, a plasticizer, an ultraviolet absorbent, a pigment disperser, a foam-restraining agent, an antifoaming agent, a preservative, and an antistatic agent.

In the present invention, an example of the method for forming the coating layer onto the polyester film includes a method of applying, onto the polyester film, an application liquid for forming the coating layer which contains a solvent, particles, and resin(s), and then drying the applied liquid. Examples of the solvent include an organic solvent such as toluene, water, and a mixed solvent of water and a water soluble organic solvent, but preferred is water alone, or a mixed solvent of water and a water soluble organic solvent from the viewpoint of environmental issues.

<Thin Film Layer>

The thin film layer used in the present invention contains, as a main component, an inorganic compound. The inorganic compound is at least one of aluminum oxide and silicon oxide. The term "main component" used herein denotes that the total proportion of aluminum oxide and silicon oxide is more than 50% by mass based on 100% by mass of the components constituting the thin layer, and the total proportion of aluminum oxide and silicon oxide is preferably 70% by mass or more, more preferably 90% by mass or more, and most preferably 100% by mass (no component other than aluminum oxide and silicon oxide is contained as a component for constituting the thin film layer). Aluminum oxide referred to herein is at least one of various aluminum oxides such as AlO, $Al_2O$ and $Al_2O_3$. The content by percentage of the various aluminum oxides is adjustable in accordance with production conditions of the thin film layer. Silicon oxide referred to herein is at least one of various silicon oxides such as SiO, $SiO_2$ and $Si_3O_2$. The content by percentage of the various silicon oxides is adjustable in accordance with the production conditions of the thin film layer. As far as properties of the thin film layer are not damaged, aluminum oxide or silicon oxide may contain other component in a trace proportion (up to at most 3% by mass of the total components).

The thickness of the thin film layer is not particularly limited, and is preferably from 5 to 500 nm, more preferably from 10 to 200 nm, even more preferably from 15 to 50 nm from the viewpoint of the gas barrier performance and flexibility of the film. If the film thickness of the thin film layer is less than 5 nm, it may be hard for the film to gain a satisfactory gas barrier performance. On the other hand, if the thickness is more than 500 nm, the film cannot gain an effect of improving a gas barrier performance corresponding to the thickness. Thus, a disadvantage is reversely produced from the viewpoint of flexing resistance and production costs.

<Physical Properties of Polyester Film>

The polyester film of the present invention has a plane orientation coefficient (ΔP) of not less than 0.005 and not more than 0.200, preferably not less than 0.020 and not more than 0.195, more preferably not less than 0.100 and not more than 0.195, further preferably not less than 0.110 and not more than 0.195, even more preferably not less than 0.120 and not more than 0.195, furthermore preferably not less than 0.130 and not more than 0.195, in particular preferably not less than 0.140 and not more than 0.190, most preferably not less than 0.140 and not more than 0.160. If the plane orientation coefficient (ΔP) is less than 0.005, the film becomes insufficient in mechanical properties, and is hard to be processed by a post-processing such as printing or processing into a bag; and the film is broken on a printer or a coater when subsequently subjected to printing or coating, and accordingly it is not preferable. In accordance with JIS K 7142-1996 5.1 (method A) with a sodium D line as a light source, the in-plane refractive index (nx) of the film in the mechanical direction (MD direction), the in-plane refractive index (ny) of the film in the direction perpendicular to the mechanical direction (TD direction), and the refractive index (nz) of the film in the thickness direction are measured through an Abbe refractometer. The plane orientation coefficient (ΔP) can then be calculated out in accordance with the following equation:

$$\Delta P = \{(nx+ny)-2nz\}/2$$

Also when a film has thin film layers on both surfaces, the plane orientation coefficient is measurable by the same method.

The polyester film of the present invention has a heat shrinkage rate when heated at 150° C. for 30 minutes (hereinafter referred to simply as heat shrinkage rate) is preferably 3.2% or less, more preferably 2.8% or less, even more preferably 2.4% or less in each of the MD direction and the TD direction. If the heat shrinkage rate is large, a color shift is generated during printing, or the film is elongated on a printer or a coater so that the printing or coating is hard to be performed, and further the film is deformed by high temperature heat, leading to a poor appearance or the like. In particular, in the process of machining with a printer or a coater, since there is no constraint between the rolls conveying the film, it tends to shrink in the width direction (TD direction) and tends to be poor appearance. Therefore, the heat shrinkage rates in TD Direction is more preferably 1.8% or less, further preferably 1.5% or less, even more preferably 1.2% or less, in particular preferably 0.9% or less, most preferably 0.6% or less. It is preferred that the heat shrinkage rate is low; however, a lower limit of the heat shrinkage rate would be 0.01% from the viewpoint of the film production.

In the present invention, the polyester film preferably has an oxygen permeability under a temperature of 23° C. and a humidity of 65% of not less than 0.1 mL/m$^2$/day/MPa and not more than 1000 mL/m$^2$/day/MPa, more preferably not less than 0.1 mL/m$^2$/day/MPa and not more than 200 mL/m$^2$/day/MPa, further preferably not less than 0.1 mL/m$^2$/day/MPa and not more than 120 mL/m$^2$/day/MPa, furthermore preferably not less than 0.1 mL/m$^2$/day/MPa and not more than 100 mL/m$^2$/day/MPa. If the oxygen permeability is more than 1000 mL/m$^2$/day/MPa, oxygen permeated through the film may unfavorably deteriorate a material or make the preservability of foods low. A lower limit of the oxygen permeability would be 0.1 mL/m$^2$/day/MPa from the viewpoint of the film production. The oxygen permeability can be further improved by using, for example, a method of applying printing or coating onto the film, or a coextruding method.

In the polyester film of the present invention, the polyester itself, which has a furandicarboxylic acid unit, has a property high in oxygen barrier performance (low oxygen permeability). The oxygen barrier performance is further improved by rendering the film a polyester film being subjected to a stretching step that will be detailed later, or allowing the film to have a thin film layer made mainly of an inorganic compound.

In the present invention, the polyester film preferably has a water vapor permeability under a temperature of 37.8° C. and a humidity of 90% of 0.1 g/m$^2$/day or more, and 40 g/m$^2$/day or less, more preferably 30 g/m$^2$/day or less, even more preferably 20 g/m$^2$/day or less. If the water vapor permeability is more than 40 g/m$^2$/day, water vapor permeated through the film may unfavorably deteriorate a material or make the preservability of foods low. A lower limit of the water vapor permeability would be 0.1 g/m$^2$/day from the viewpoint of the film production. The water vapor permeability can be further improved by using, for example, a method of applying printing or coating onto the film, or a coextruding method.

In the polyester film of the present invention, the polyester itself, which has a furandicarboxylic acid unit, has a property high in water vapor barrier performance (low water vapor permeability). The water vapor barrier performance is further improved by rendering the film a polyester film being subjected to a stretching step that will be detailed later, or allowing the film to have a thin film layer made mainly of an inorganic compound.

The in-plane refractive index (nx) of the polyester film in the longitudinally stretching direction (MD direction) and the in-plane refractive index (ny) of the polyester film in the direction perpendicular to the longitudinally stretching direction (TD direction) are each preferably 1.5700 or more, more preferably 1.5800 or more, further preferably 1.5900 or more, even more preferably 1.6000 or more, in particular preferably 1.6100 or more, most preferably 1.6200 or more. By setting the nx and the ny to 1.5700 or more, the film can gain a sufficient breaking strength and breaking elongation, so that the film is sufficient in mechanical properties. Therefore, for example, the film is easily subjected to post-processing, such as printing or forming into a bag, and the film is not easily broken onto a printer or coater at the time of the subsequent printing or coating, and accordingly, it is preferable. The nx and the ny are preferably less than 1.7000 from the viewpoint of the production and the heat shrinkage rate.

In the polyester film of the present invention, the breaking strength in the MD direction and the TD direction is preferably 75 MPa or more. A lower limit of the breaking strength is preferably 100 MPa, more preferably 150 MPa, further preferably 200 MPa, furthermore preferably 220 MPa. If the breaking strength is less than 75 MPa, the film is insufficient in mechanical strength so that the film is elongated in the step of processing the film, and the film unfavorably undergoes a shift out of position or inconveniences easily. When taking the film production into consideration, an upper limit of the breaking strength is 1000 MPa.

In the polyester film of the present invention, the breaking elongation in the MD direction and the TD direction is preferably 10% or more. A lower limit of the breaking elongation is preferably 15%, more preferably 20%, in particular preferably 30%. If the breaking elongation is less than 10%, the film is insufficient in mechanical elongation so that the film is unfavorably cracked, broken or undergoes inconveniences in the step of processing the film. When taking the film production into consideration, an upper limit of the breaking elongation is 300%. The upper limit of the breaking elongation is preferably 150%, more preferably 100%, further preferably 80%.

The polyester film of the present invention preferably has a coefficient of static friction ($\mu$s) of 1.0 or less, and a coefficient of dynamic friction ($\mu$d) of 1.0 or less. The coefficient of static friction ($\mu$s) is more preferably 0.8 or less, further preferably 0.6 or less. The coefficient of dynamic friction ($\mu$d) is more preferably 0.8 or less, further preferably 0.6 or less. If the coefficient of static friction ($\mu$s) or the coefficient of dynamic friction ($\mu$d) is more than 1.0, the film is deteriorated in easy-slipping properties to be unfavorably scratched or wrinkled by friction when running. The coefficient of static friction ($\mu$s) is the coefficient of static friction between one of the surfaces of the laminated polyester film of the present invention and the other surface. The coefficient of dynamic friction ($\mu$d) is the coefficient of dynamic friction between one of the surfaces of the polyester film of the present invention and the other surface.

The polyester film of the present invention preferably has a total light transmittance of 75% or more. The film is desirably high in transparency in order to improve a detection precision of an internal foreign matter as a defect of the film. For the high transparency, the laminated polyester film of the present invention preferably has a total light transmittance of 75% or more, more preferably 80% or more, further preferably 88.5% or more, in particular preferably 89% or more. In order to improve a detection precision of an internal foreign matter as a defect of the film, the higher the total light transmittance is, the better. It is however technically difficult to attain a total light transmittance of 100%.

The polyester film of the present invention preferably has a haze of 15% or less. For the purpose of performing defect examination of contents in food-packing use, the film is desirably less cloudy. For this reason, the polyester film of the present invention preferably has a haze of 15% or less, more preferably 8% or less, further preferably 3% or less, in particular preferably 1% or less. The lower the haze is, the better; however, a lower limit of the haze would be 0.1% from the viewpoint of the intrinsic refractive index of the polyester film.

In the polyester film of the present invention, a lower limit of impact strength (impact resistance) calculated in 15 $\mu$m equivalent is preferably 0.4 J/15 µm, more preferably 0.6 J/15 µm, further preferably 0.8 J/15 µm. If the lower limit is less than 0.4 J/15 µm, the film may be insufficient in strength when used for a bag. An upper limit of impact strength (impact resistance) is preferably 3.0 J/15 µm. If the upper limit is more than 3.0 J/15 µm, the effect of improvement is saturated.

The polyester film of the present invention has a thickness of not less than 1 µm and not more than 300 µm, preferably not less than 5 µm and not more than 200 µm, further preferably not less than 10 µm and not more than 100 µm, in particular preferably not less than 10 µm and not more than 40 µm. If the thickness is more than 300 µm, a problem is caused regarding costs, and the film is easily lowered in visibility when used as a packing material. If the thickness is less than 1 µm, the film may be lowered in mechanical properties so that the film may not unfavorably function as the polyester film of the present invention.

When the polyester film of the present invention is wound into a roll form, the winding length and width of the film roll are appropriately determined in accordance with the film roll use. The winding length of the film roll is preferably 100 m or more, more preferably 1000 m or more. The width of the film roll is preferably 200 mm or more, more preferably 1000 mm or more.

A method for producing the polyester film of the present invention will be described. A typical example of the method using PEF pellets will be described in detail; however, it is natural that the method is not limited to this example.

First, a polyethylene furandicarboxylate-based resin is dried, or dried with hot wind so as to have a water content of less than 200 ppm. Next, raw materials are each weighed. The weighed materials are mixed with each other, and the mixture is supplied into an extruder to be melt-extruded into a sheet form. Furthermore, the melted sheet is allowed to adhere closely to a rotary metal roll (casting roll) by a static electricity applying method, and then cooled and solidified to yield an unstretched sheet.

At any time when the melted resin is kept at a temperature of 220 to 280° C., the resin can be subjected to high-precision filtration to remove foreign matters contained in the resin. A filter material used for the high-precision filtration of the melted resin is not particularly limited. When the filter material is a sintered stainless steel body, this material is preferable because the material is excellent in removal performance of aggregates made mainly of Si, Ti, Sb, Ge and Cu, and high melting point organic materials.

The layer containing, as a main component, polyethylene furandicarboxylate-based resin may be made into a multi-layered structure. The multilayered structure can be attained by coextruding a surface layer (a layer), an intermediate layer (b layer), and the like.

In the case of coextruding the surface layer (a layer) and the intermediate layer (b layer) to be laminated onto each other, two or more extruders are used to extrude respective raw materials for each of the layers, and then a multilayer feed block (for example, a confluent block having a rectangular confluent part) is used to join the two layers with each other. The joined layer is extruded through a slit-form die into a sheet form. The sheet is cooled and solidified onto a casting roll to produce an unstretched film. Alternatively, instead of the multilayer feed block, a multi-manifold die may be used.

Next, the unstretched film yielded by the above-mentioned method is biaxially stretched, and then subjected to a thermal treatment.

For example, when a biaxially oriented polyester film is produced by biaxially-stretching an unstretched film having a furandicarboxylic acid unit, the following method may be adopted: a sequentially biaxially stretching method of mono-axially-stretching the unstretched film in the MD direction or the TD direction, and then stretching the resultant film in the orthogonal direction; a simultaneously biaxially stretching method of stretching the unstretched film simultaneously in the MD direction and the TD direction; or a method of using a linear motor as a driving means when the simultaneously biaxially stretching is performed. In the case of the sequentially biaxially stretching method, the MD stretching can be attained by stretching the unstretched film in the MD direction with a stretching-speed difference through a heating roll. For the heating, for example, an infrared heater may be together used. The subsequent TD stretching can be attained by leading the MD stretched sheet into a tenter, grasping both edges of the MD stretched sheet with clips, and then stretching the sheet in the TD direction while the sheet is heated. The TD-stretched film is subsequently subjected to a thermal treatment in the tenter. The thermal treatment may be conducted in the state of stretching the film by the TD stretching, or the thermal treatment may be conducted while the film is relaxed in the TD direction. The thermally treated film may be cut down in its both edges, and may be wound up through a winder.

Patent Documents 5 and 6 disclose a method for producing a PEF/PEF-derivative film monoaxially stretched at a stretching ratio of 1.6 to 16 times. However, the disclosed method does not make it possible that the film attains mechanical properties usable for industries and packages. Thus, the present inventors have made eager researches to allow a film to attain high mechanical properties by performing stretching and relaxation manners (i) to (ix) below. Moreover, the film can attain a high barrier performance by forming a thin film layer as described in item (x) below.

A method for producing the polyester film of the present invention will be specifically described with reference to FIG. 1. FIG. 1 is an example of a plan view showing a transverse stretching step in a film-forming apparatus used in the present invention. Both edges of a film stretched in the mechanical direction are gripped with clips 7, and the film is led through a pre-heating zone 1, a stretching zone 2, a heat fixation zone 3, relaxation zones 4 and 5, and a cooling zone 6 to a winding step at the downstream of the apparatus.

In order to yield the polyester film of the present invention, it is preferred that the film is passed through a highest-temperature part in the heat fixation treatment, or the film is subjected to a relaxation treatment in the relaxation zone, an end portion of the film is then immediately separated, and the film is subjected to a relaxation heat treatment (hereinafter simply referred to as a relaxation treatment) in the mechanical direction and the transverse direction. This makes it possible to keep the maximum value of the heat shrinkage rate low.

(i) Control of Stretching Ratio of Film in MD Direction

In order to yield a polyester film used in the present invention, it is desired to stretch an unstretched film in the MD direction at a stretching ratio ranging from 1.1 to 10.0 times. By stretching the film at a stretching ratio of 1.1 times or more (preferably 1.5 times or more) in the MD direction, a film can be produced which has a plane orientation coefficient ($\Delta P$) of 0.005 or more. The stretching ratio in the MD direction is preferably 2.5 times or more, more preferably 3.5 times or more, more preferably 3.8 times or more, further preferably 4.0 times or more, in particular preferably 4.5 times or more. By setting the ratio to 2.5 times or more, a film excellent in mechanical properties can be produced which has a ΔP of 0.02 or more, refractive indexes nx and ny in the MD and the TD directions of 1.5700 or more, a film breaking strength of 100 MPa or more, and a film breaking elongation of 15% or more. When the stretching ratio in the MD direction is 10.0 times or less, the frequency of breaking of the film is favorably reduced. As the stretching ratio in the MD direction is higher, the temperature for the heat fixation step can be made higher and the heat shrinkage rate can be made lower.

(ii) Control of Stretching Temperature of Film in MD Direction

In order to yield a polyester film used in the present invention, it is desired to stretch the resultant film in the MD direction at a temperature ranging from not lower than 90° C. and not higher than 150° C. The temperature ranges more preferably not lower than 100° C. and not higher than 125° C. When the stretching temperature in the MD direction is 90° C. or higher, the frequency of breaking of the film is favorably reduced. When the temperature is 150° C. or lower, the film can be favorably uniformly stretched.

(iii) Control of Stretching Ratio of Film in TD Direction

In order to yield a polyester film used in the present invention, it is desired to stretch the resultant film in the TD direction at a stretching ratio of 1.1 to 10.0 times into the TD direction. By stretching the film at a stretching ratio of 1.1 times or more (preferably 1.5 times or more) in the TD direction, a film can be produced which has a plane orientation coefficient (ΔP) of 0.005 or more. The stretching ratio in the TD direction is preferably 3.0 times or more, more preferably 3.5 times or more, further preferably 4.0 times or more, in particular preferably 4.5 times or more. By setting the ratio to 3.0 times or more, a film excellent in mechanical properties can be produced in which ΔP is 0.02 or more, refractive indexes nx and ny in the MD and the TD directions are each 1.5700 or more, breaking strength is 75 MPa or more, and breaking elongation is 15% or more. When the stretching ratio in the TD direction is 10.0 times or less, the frequency of breaking of the film is favorably reduced.

(iv) Control of Stretching Temperature in TD Direction

In order to yield a polyester film used in the present invention, it is desired to stretch the resultant film in the TD direction at a temperature ranging not lower than 80° C. and not higher than 200° C. The temperature ranges more preferably not lower than 95° C. and not higher than 135° C. When the stretching temperature in the MD direction is 80° C. or higher, the frequency of breaking of the film is favorably reduced. When the temperature is 200° C. or lower, the film can be favorably uniformly stretched.

(v) Control of Heat Fixation Temperature of Film

In order to yield a polyester film used in the present invention, it is desired to subject the resultant film to a heat fixation treatment at a temperature ranging not lower than 110° C. and not higher than 220° C. When the heat fixation temperature is 220° C. or lower (preferably 210° C. or lower), favorably, the film is hard to be opaque and the frequency of melting breaking of the film is reduced. By making the heat fixation temperature high, the film is favorably reduced in heat shrinkage rate. The temperature is more preferably 120° C. or higher, further preferably 140° C. or higher, even more preferably 160° C. or higher, in particular preferably 175° C. or higher, most preferably 185° C. or higher. The heat fixation treatment tends to increase the plane orientation coefficient (ΔP).

(vi) Control of Relaxation Temperature in TD Direction

In order to yield a polyester film used in the present invention, it is desired to subject the resultant film to a relaxation treatment in the TD direction at a temperature ranging not lower than 100° C. and not higher than 200° C. The relaxation temperature in the TD direction is preferably not lower than 165° C. and not higher than 195° C., more preferably not lower than 175° C. and not higher than 195° C. This can favorably make the heat shrinkage rate small.

(vii) Control of Relaxation Ratio in TD Direction

In order to yield a polyester film used in the present invention, it is desired to set a relaxation ratio to the range of not less than 0.5% and not more than 10.0% in the TD direction. The relaxation ratio in the TD direction is preferably not less than 2% and not more than 6%. This case can favorably make the heat shrinkage rate small.

(viii) In-Process Relaxation Treatment

It is preferred to conduct the relaxation heat treatment to allow the film to undergo the highest temperature of the heat fixation zone 3, thereby removing appropriately residual stretch stress remaining in the crystallized film. The relaxation heat treatment can be conducted, for example, by separating the film from the clips in the relaxation zone 4 or 5. Furthermore, it is preferred to make the pulling speed in the winding step lower than the film-forming speed in the transverse stretching step. It is preferred to subject the film to the relaxation heat treatment without being cooled after the film undergoes the highest temperature of the heat fixation zone 3.

(viii)-(A) Control of in-Process Relaxation Treatment Temperature

The temperature of the relaxation zone 4 or 5 is preferably from 140 to 200° C., more preferably from 160 to 180° C. In the case where the temperature of the relaxation zone 4 or 5 is from 140 to 200° C., the maximum value of the shrinkage rate favorably becomes small when the film is heated at 150° C. for 30 minutes. In the relaxation heat treatment at a temperature lower than 140° C., the all-direction shrinkage rate is hard to be decreased when the film is heated at 150° C. for 30 minutes. In the relaxation heat treatment at a temperature higher than 200° C., the film is lowered in elastic modulus to be deteriorated in flatness.

(viii)-(B) Control of in-Plane Treatment Relaxation Ratio

After the film undergoes the highest temperature part in the heat fixation treatment, an end portion of the film is separated without cooling the film, so that the film is freely relaxed in the transverse direction. Thus, the control of the relaxation heat treatment temperature makes the heat shrinkage rate very low in the transverse direction. The heat shrinkage rate in the machine direction is defined by an equation (1) described below. This rate is highly correlative with the relaxation ratio in the machine direction, so that the relaxation ratio in the machine direction is preferably from 1.0 to 15.0%, more preferably from 3.0 to 10.0%. When the relaxation ratio in the machine direction is 15.0% or less, the flatness of the film is favorably excellent. When the relaxation ratio in the machine direction is 1.0% or more, the maximum value of the heat shrinkage rate favorably becomes small.

"Relaxation ratio in machine direction"=((film speed before end portion separation−film speed in winding step)/film speed before end portion separation)×100(%)  (1)

(viii)-(C) Method for Separating Film End Portion in in-Plane Relaxation Treatment The method for separating the film end portion is not particularly limited, and may be, for example, a method of setting up a cutting blade to the relaxation zone 4 or 5 to cut and separate the end portion, or a method of releasing the film end portion from the clips in the relaxation zone 4 or 5.

In the method of releasing the film end portion from the clips in the relaxation zone 4 or 5, a stable relaxation heat treatment can be more favorably conducted regardless of the relaxation ratio in the machine direction.

(ix) Relaxation Treatment in the MD Direction

An example of the method reducing heat shrinkage rate in MD directions includes a method of guiding the resultant film intermediate come out the tenter to a dry furnace and heating the resultant film in the dry furnace, that is, relaxation treatment in the MD direction is subjected to use the speed difference between before and after the dry furnace. The dry furnace may be continuously arranged at the above process, or it is also possible to subject the resultant film to a relaxation treatment at the dry furnace after temporarily winding the resultant film. In place of in-process relaxation treatment, the above relaxation treatment in the MD direction may be used. Also, both in-process relaxation treatment and the above relaxation treatment in the MD direction may be used.

(x) Method for Producing Thin Film Layer

For producing the thin film layer, a known production method is appropriately used, such as PVD methods (physical vapor deposition methods) of vacuum deposition method, sputtering method, and ion plating method; and CVD methods (chemical vapor deposition methods). The physical vapor deposition methods are preferred, and among the methods, a vacuum deposition method is more preferred. For example, in the vacuum deposition method, a mixture of $Al_2O_3$ and $SiO_2$ or a mixture of Al and $SiO_2$ is used as a vapor deposition material. A heating manner may be, for example, resistance heating, high frequency induction heating, or electron beam heating. As a reactive gas, for example, oxygen, nitrogen or water vapor may be introduced. Reactive vapor deposition may be used with ozone addition, an ion assisting means or the like. As far as the object of the present invention is not damaged, conditions for producing the thin film layer may be varied, for example, a bias voltage is applied onto the substrate, or the substrate is raised in temperature, or cooled. The same is applied to other production methods, for example, sputtering and CVD methods.

At any stage in the process for producing the polyester film, the coating layer should be formed by applying an application liquid for forming the coating layer onto at least one surface of a polyester film. It is preferred to form the coating layer by applying the application liquid for forming the coating layer onto an unstretched or monoaxially-stretched polyester film, drying the workpiece, stretching the dried film in at least one axial direction, and then subjecting the film to a thermal treatment.

The coating layer may be formed onto both surfaces of the polyester film, or may be formed onto only one of the surfaces. It is preferred to form the coating layer onto one of the surfaces of the polyester film, and to form the thin film layer onto the other surface. In the application liquid for forming the coating layer, the solid content in the resin composition is preferably from 2 to 35% by mass, in particular preferably from 4 to 15% by mass.

The method for applying this application liquid for forming the coating layer onto the film may be any known method. Examples thereof include reverse roll-coating, gravure coating, kiss coating, die coater, roll brushing, spray coating, air knife coating, and wire bar coating, pipe doctor, impregnation coating, and curtain coating methods. The application is attained by using these methods singly or in combination.

A thickness of the dried coating layer is preferably from 20 to 350 nm, and the application amount of the dried coating layer is preferably from 0.02 to 0.5 $g/m^2$. If the application amount of the coating layer is less than 0.02 $g/m^2$, this layer hardly gives an advantageous effect for the adhesiveness. On the other hand, if the application amount is more than 0.5 $g/m^2$, the laminated polyester film may be deteriorated in transparency.

The polyester film used in the present invention is a film produced by the method for producing a polyester film involving a stretching step of stretching an unstretched film in the mechanical direction and the perpendicular direction to produce a stretched film, and a relaxing step of relaxing the stretched film. The film production method is not limited to the method disclosed specifically above as far as the method is within the scope of the above-mentioned technical idea. It is important for producing the film of the present invention to make highly precise controls under the above-mentioned production conditions on the basis of the technical idea.

In the polyester used in the present invention, the breaking strength, breaking elongation, and heat shrinkage rate of the film are controllable under conditions for the above-mentioned stretching and thermal treatment independently or in combination. These conditions are selected at will. By combination of the above items (i) to (ix) as preferred conditions, a film can be obtained which has a plane orientation coefficient ($\Delta P$) of 0.100 or more, a heat shrinkage rate of 4.5% or less in each of the MD direction and the TD direction (preferably 3.2% or less), a film breaking strength of 150 MPa or more (preferably 200 MPa or more, more preferably 240 MPa or more), and a breaking elongation of 40% or more.

For example, in order to obtain a film having a plane orientation coefficient ($\Delta P$) of 0.130 or more, a heat shrinkage rate of 3.2% or less in each of the MD direction and the TD direction, and a film breaking strength of 150 MP or less, it is effective to heighten the stretching ratio in the MD direction and that in the TD direction, to conduct the heat fixation treatment at a higher temperature, and to subject the workpiece to in-process relaxation heat treatment, thereby removing residual stretch stress remaining in the film. Specifically, a film can be obtained which has a plane orientation coefficient ($\Delta P$) of 0.130 or more, a breaking strength of 150 MP or more, and a heat shrinkage rate of 3.2% or less in each of the MD direction and the TD direction by setting the stretching ratio in the MD direction to 4.0 times or more (preferably 4.5 times or more) and that in the TD direction to 4.0 times or more (preferably 4.5 times or more), setting the temperature for the heat fixation treatment to 190° C. or higher, and conducting the in-process relaxation heat treatment into 5% in the mechanical direction at 160° C.

In order to obtain a film small in heat shrinkage rate, it is effective to make the stretching ratio small in each of the mechanical direction and the transverse direction and to heighten the stretching temperature to such an extent that the stretched film can undergo heat fixation treatment at a higher temperature without conducting any relaxation treatment, thereby weakening the orientation of the molecular chains. Specifically, a film can be obtained which has a plane orientation coefficient ($\Delta P$) of 0.100 or more and less than 0.130, a breaking strength of 150 MP or more and a heat shrinkage rate of 3.2% or less in each of the MD direction and the TD direction by setting the stretching ratio in the MD direction to the range of not less than 3.5 times and not more than 5.0 times and that in the TD direction to the range of not less than 4.0 times and not more than 5.0 times, and setting the temperature for the heat fixation step to 190° C. or higher through an appropriate stretching temperature.

When the coating layer is formed on the produced stretched film, a polyester film can be produced which has a plane orientation coefficient (ΔP) of 0.110 or more and a heat shrinkage rate of 3.2% or less in each of the MD direction and the TD direction.

During the stretching step or after the termination of the stretching for the present film, the film may be subjected to a corona treatment or a plasma treatment. When the film is coated with a liquid or dispersion liquid obtained by mixing, e.g., a resin, a crosslinking agent and particles appropriately with one another and dissolving the mixture in a solvent, it is also possible to give the film slipping properties, blocking resistance, antistatic properties, high adhesiveness, and the like. Various stabilizers, pigments, UV absorbents and the like may be blended into the film of the present invention.

By subjecting the stretched and thermally treated film to surface treatment, functions of the film can be improved. The treatment is, for example, printing or coating.

The film after the completion of stretching and heat treatment and the surface-treated film can be used for a packaging body, a label, a design sheet, or the like by laminating paper.

The present application claims the priority based on Japanese Patent Application No. 2016-068297 filed on Mar. 30, 2016. The entire contents in the specification of Japanese Patent Application No. 2016-068297 filed on Mar. 30, 2016 are incorporated herein by reference.

EXAMPLES

The following will describe the advantageous effects of the present invention with reference to examples and comparative examples. First, methods for evaluating property values used in the present invention will be described hereinafter.

(1) Breaking Strength and Breaking Elongation

A single-edged razor was used to cut a film, along the MD direction and the TD direction of the film, into a sample in the form of a strip having a length of 140 mm and a width of 10 mm. Next, an autograph AG-IS (manufactured by Shimadzu Corporation) was used to pull the strip-form sample. From the resultant load-strain curve, the breaking strength (MPa) and breaking elongation (%) of the film were determined in each of the directions.

The measurement was made in an atmosphere of 25° C. under conditions that a distance between chucks was 40 mm, a crosshead speed was 100 mm/minute, and a load cell was 1 kN. The measurement was made 5 times, and an average value of the measured values was used for evaluation.

(2) Plane Orientation Coefficient (ΔP)

In accordance with JIS K 7142-1996 5.1 (method A), a sodium D line was used as a light source to measure the in-plane refractive index (nx) of film in the MD direction, the in-plane refractive index (ny) of film in the direction perpendicular to the MD direction, and the refractive index (nz) in the thickness direction through an Abbe refractometer. A plane orientation coefficient (ΔP) of the film was then calculated in accordance with an equation described below. As a contact liquid, methylene iodide was used.

$$\Delta P = \{(nx+ny) - 2nz\}/2$$

When a coating layer was formed on a single surface of the film, the coating layer and a surface of the film that was opposite to the coating layer was measured 3 times. An average value of the measured values was defined as the plane orientation coefficient ΔP.

When coating layers were formed on both surfaces of the film, each of the coating layer surfaces was measured 3 times. An average value of the measured values was defined as the plane orientation coefficient ΔP.

(3) Total Light Transmittance and Haze

A total light transmittance and a haze were measured in accordance with JIS K 7136 "Plastics-Determination of haze for transparent materials". As a measuring device, an NDH-5000 model turbidimeter manufactured by Nippon Denshoku Industries Co., Ltd. was used.

(4) Heat Shrinkage Rates (Heat Shrinkage Rates in MD and TD Directions)

A film was cut into a size having a width of 10 mm and a length of 250 mm along a direction of a heat shrinkage rate to be measured. Marks were made at intervals of 150 mm, and respective distances (A) between the marks were measured under a constant tension of 5 gf. Next, the film was put into an oven in an atmosphere of 150° C., and thermally treated at 150±3° C. under no load for 30 minutes. Thereafter, under a constant load of 5 gf, respective distances (B) between the marks were measured. The heat shrinkage rate of the film was determined in accordance with the following equation:

$$\text{Heat shrinkage rate}(\%) = (A-B)/A \times 100$$

(5) Oxygen Permeability (OTR)

In accordance with JIS K7126 the method 2A, an oxygen permeability measuring instrument (OX-TRAN (registered trademark) 2/21, manufactured by Mocon Inc.) was used to measure an oxygen permeability of a film under a temperature of 23° C. and a humidity of 65%.

The film was fitted to the instrument so that a surface of the film that is opposite to the coating layer of the film was placed at a humidity-adjusting side.

(6) Water Vapor Permeability (WVTR)

In accordance with JIS K7129 the method B, a water vapor permeability measuring instrument (PERMA-TRAN-W (registered trademark) 3/33, manufactured by Mocon Inc.) was used to measure a water vapor permeability of a film under a temperature of 37.8° C. and a humidity of 90%.

The film was fitted to the instrument so that a surface of the film that was opposite to the coating layer of the film was placed at a humidity-adjusting side.

(7) Intrinsic Viscosity (IV)

A polyester resin was pulverized and dried, and then dissolved into a mixed solvent of p-chlorophenol and tetrachloroethane (ratio by weight=75/25). An Ubbelohde viscometer was used to measure a flow time period of a solution having a concentration of 0.4 g/dL at 30° C., and a flow time period of a solvent alone. From a ratio between these time periods, Huggins equation was used to calculate an intrinsic viscosity of the polyester resin on the supposition that the Huggins constant is 0.38.

(8) Film Thickness

An instrument MILLITRON was used to cut a film to be measured into four samples each having 5 cm square from four arbitrarily-selected spots of the film. Five points of each of the samples (total: 20 points) were measured. An average value of the measured values was defined as the thickness of the film.

(9) Oxygen Permeability Test for Packing Container i) Preparation of Coloring Liquid Into a glass container are put 2 L of water and 6.6 g of powdery agar, and the container was immersed in hot water of 95° C. to warm the contents in the container for 1 hour or longer, so that the agar was completely dissolved. A 50-mesh wire net was used to filter the solution to remove gelatinized foreign matters. To the solution was added 0.04 g of methylene blue. Inside a glove box into which nitrogen was beforehand allowed to flow for 15 minutes or more, 1.25 g of sodium hydrosulfite was added to the solution, and then these components are mixed with each other into an even state, so that a coloring liquid (colorless) could be obtained.

ii) Production of Film Packing Container

A polyester-based adhesive was applied onto a laminated polyester film produced in each of examples, or a polyester film produced in each of comparative examples, and then a linear low-density polyester film (LLDPE film: L4102, manufactured by Toyobo Co., Ltd.) having a thickness of 40 μm was subjected to dry lamination onto the workpiece. The resultant was aged at 40° C. for 3 days to obtain a laminated film. This laminated film was used to produce a three-way sealed bag having an inside dimension of a width of 70 mm and a length of 105 mm.

iii) Filling with Coloring Liquid

Inside the glove box into which nitrogen was beforehand allowed to flow for 15 minutes or more, about 30 mL of the coloring liquid was put into the three-way sealed bag. The bag was filled with nitrogen, and then closed with a sealer. In this way, a packing container filled with the coloring liquid could be obtained.

iv) Oxygen Permeability Test

The agar was solidified at room temperature, and then the packing container filled with the coloring liquid was transferred into a thermostat of 40° C. A change in the color of the color liquid was observed after 72 hours. The color change was judged in accordance with criteria described below. When the film was judged to be A, the film was determined to be acceptable.

A: The color was hardly changed.
B: The color was slightly changed.
C: The color was largely changed.

(10) Heat Resistance Test for Laminated Film

A laminated polyester film was cut into a length of 100 mm and a width of 100 mm to prepare a film sample. The film sample was put in an oven heated to 130° C. for 5 minutes, and a change in the appearance of the film sample was observed. The appearance change was judged in accordance with criteria described below. When the film sample was judged to be A or B, the film sample was determined to be acceptable.

A: The appearance was hardly changed.
B: The appearance was slightly changed.
C: The appearance was largely changed.

(11) Coefficient of Static Friction (μs) and Coefficient of Dynamic Friction (μd)

A film was cut into an area of 8 cm×5 cm to be made into a sample. One of the two surfaces of the sample was conveniently represented as a surface A, and the other surface of the sample was represented by a surface B. This sample was fixed onto a bottom surface of a metallic rectangular parallelepiped having a weight of 1.4 kg, the size of the bottom surface being 6 cm×5 cm, to face the surface A outside. At this time, the 5-cm-width direction of the sample was made consistent with the 5-cm-width direction of the metallic rectangular parallelepiped. A side in the longitudinal direction of the sample was folded, and then the sample was fixed onto a side surface of the metallic rectangular parallelepiped through a pressure-sensitive adhesive tape.

Next, the same film was cut into an area of 20 cm×10 cm to be made into a different sample. End portions in the longitudinal direction of the different sample were fixed through a pressure-sensitive adhesive tape onto a flat metallic plate to face its surface B upward. The metallic rectangular parallelepiped onto which the sample adheres was put onto this different sample so as to bring a measuring surface of the sample into contact with the different sample. A coefficient of static friction (μs) and a coefficient of dynamic friction (μd) were measured at a pulling speed of 200 mm/minute under conditions of a temperature of 23° C. and a humidity of 65% RH. For the measurement, an instrument RTM-100 manufactured by Toyo Baldwin Co., Ltd. was used, and the coefficient of static friction (μs) and the coefficient of dynamic friction (μd) were calculated in accordance with JIS K-7125.

(12) Appearance of Polyester Film Roll

A film roll obtained in each of examples and comparative examples was slit into a film width of 300 mm to make a central position in the width direction of the film consistent with the center of a winding core. The film was wound up to have a winding length of 100 m onto the core having an internal diameter of 3 inches at a winding speed of 5 m/minute, so that a polyester film roll was produced.

The appearance of the polyester film roll was judged in accordance with criteria described below. When the roll was judged to be A, the roll was determined to be acceptable.

A: Appearance defects such as wrinkles or gauge bands are not observed.
B: Appearance defects such as wrinkles or gauge bands are partially observed on the roll.

(13) Film Thickness of Coating Layer

A transmission electron microscope was used to measure, from a cross section of a laminated polyester film, a film thickness of a coating layer.

(14) Impact Strength

An impact tester manufactured by Toyo Seiki Seisaku-sho was used to measure a strength of a film against impact punching of the film in an atmosphere of 23° C. An impact spherical surface used was a surface having a diameter of ½ inch. The unit of the strength was J. The measured value was divided by the thickness of the film, and then an evaluation value was used which was obtained by converting the measured value into a value per 15 μm.

(15) Film-Formation Stability

A stability evaluation during film formation was judged in accordance with criteria described below.

A: The film could be continuously formed without breakage for 20 minutes.
B: The film was broken or wrinkled one or two times for 20 minutes.
C: The film was broken or wrinkled three or more times for 20 minutes.

(16) Model Test for Thermal Processing

In the state where a processing tension of 10 kg/m was applied onto a polyester film, the film was subjected to a thermal treatment at 150° C. for 10 minutes. This sample was cut out from the roll, and the cut sample was extended into a length of 5 m on a flat table. Onto the sample-applied surface, light from a fluorescent lamp was reflected to check the presence or absence of thermal wrinkles. The film was judged in accordance with criteria described below.

A: The film has no thermal winkle to be good.
B: The film partially has thermal winkles.
C: The entire surface of the film has thermal winkles.

(17) Composition and Film Thickness of Thin Film Layer

A fluorescent X-ray analyzer (ZSX 100e, manufactured by Rigaku Corporation) was used to determine composition and film thickness of an inorganic compound with the use of a calibration curve prepared beforehand. Conditions for an exciting X-ray tube were 50 kV and 70 mA.

The calibration curve was obtained through the following procedures.

Several kinds of films each having an inorganic compound thin film made of aluminum oxide and silicon oxide were produced, and an induced coupled plasma emission technique (ICP technique) was used to determine the adhesion amount of each of the aluminum oxide and the silicon oxide. Next, a fluorescent X-ray analyzer (ZSX 100e, manufactured by Rigaku Corporation) was used (conditions for exciting X-ray tube: 50 kV and 70 mA) to analyze each of the films, in which the adhesion amount had been obtained, thereby determining the fluorescent X-ray intensity of each of the aluminum oxide and the silicon oxide in each of the samples. A relationship was determined between the fluorescent X-ray intensity and the adhesion amount obtained by the ICP to prepare a calibration curve.

The adhesion amount obtained by the ICP was on mass basis, and thus, this amount was converted into film thickness composition by the following manner.

The film thickness of the inorganic oxide thin film was calculated on the supposition that the density of the thin film was regarded as 80% based on the bulk density of the thin film, and even when the aluminum oxide and the silicon oxide were in a mixed state, the volume of each of the oxides was kept.

When Ma ($g/cm^2$) and Ms ($g/cm^2$) represent the adhesion amount of the aluminum oxide per unit area and that of the silicon oxide per unit area, respectively, a content wa (% by mass) of the aluminum oxide in the film and a content ws (% by mass) of the silicon oxide in the film are determined in accordance with the following equations (1) and (2), respectively:

$$wa=100\times[Ma/(Ma+Ms)] \quad (1)$$

$$ws=100-wa \quad (2)$$

Specifically, when Ma ($g/cm^2$) and $\rho a$ (3.97 $g/cm^3$) represent the adhesion amount of the aluminum oxide per unit area and the bulk density of the aluminum oxide, respectively, and Ms ($g/cm^2$) and $\rho s$ (2.65 $g/cm^3$) represent the adhesion amount of the silicon oxide per unit area and the bulk density of the silicon oxide, respectively, a film thickness t (nm) are determined in accordance with the following equation (3):

$$t=((Ma/(\rho a\times0.8)+Ms/(\rho s\times0.8))\times10^7 \quad (3)$$

The value of the film thickness measured by the fluorescent X-ray analyzer was close to that of the film thickness measured actually through TEM.

(Formulation of Application Liquid A for Forming Coating Layer)

Into a reactor were charged dimethyl terephthalate (95 parts by mass), dimethyl isophthalate (95 parts by mass), ethylene glycol (35 parts by mass), neopentyl glycol (145 parts by mass), zinc acetate (0.1 parts by mass), and antimony trioxide (0.1 parts by mass). The components were allowed to undergo an interesterification reaction at 180° C. over 3 hours. Next, thereto was added sodium 5-sulfoisophthalate (6.0 parts by mass) to allow the components to undergo an interesterification reaction at 240° C. over 1 hour. Thereafter, the components were allowed to undergo a polycondensation reaction at 250° C. under a reduced pressure (of 0.2 to 10 mmHg) over 2 hours to yield a copolymerized polyester (A) having a number-average molecular weight of 19,500 and a softening point of 60° C.

The followings were mixed with one another: 7.5 parts by mass of a 30% by mass resultant copolymerized polyester (A) in aqueous dispersion liquid; 11.3 parts by mass of a 20% by mass self-crosslinkable polyurethane (B) (ELASTRON (registered trademark) 11-3, manufactured by DKS Co., Ltd.) in aqueous solution, the polyurethane (B) containing isocyanate groups blocked with sodium bisulfite; 0.3 parts by mass of a catalyst (Cat 64, manufactured by DKS Co., Ltd.) for ELASTRON; 39.8 parts by mass of water; and 37.4 parts by mass of isopropyl alcohol. Furthermore, thereto were added 0.6 parts by mass of a 10% by mass fluorine-containing nonionic surfactant (MEGAFAC (registered trademark) F444, manufactured by DIC Corporation) in aqueous solution, 2.3 parts by mass of 20% by mass colloidal silica (SNOWTEX (registered trademark) OL, manufactured by Nissan Chemical Industries, Ltd.; average particle diameter: 40 nm) as particles P in aqueous dispersion liquid, 0.5 parts by mass of 3.5% by mass dry-method silica (AEROSIL OX50, manufactured by Nippon Aerosil Co., Ltd.; average particle diameter: 200 nm, and average primary particle diameter: 40 nm) as particles Q in aqueous dispersion liquid. Next, the pH of the application liquid for forming a coating layer was adjusted to 6.2 with a 5% by mass sodium bicarbonate aqueous solution, and then the liquid was subjected to precise filtration through a felt-type polypropylene filter having a filtrating particle size (initial filtrating efficiency: 95%) of 10 μm to prepare an application liquid A for forming the coating layer.

Example 1

As a raw material, polyethylene 2,5-furandicarboxylate manufactured by Avantium (IV=0.90) was used. The material was dried at 100° C. under reduced pressure (1 Torr) for 24 hours, and then supplied to a biaxial extruder (screw diameter: 30 mm, and L/D=25). While the resin temperature of the extruder, from a melting part of the extruder through a kneading part and a pipe of the extruder to a gear pump of the extruder, was set to 270° C., and the temperature at any subsequent pipe was set to 275° C., the resin supplied into the biaxial extruder was melt-extruded through a T die (mouthpiece) into a sheet form.

The extruded resin was cast onto a cooling drum having a surface temperature of 20° C., and allowed to adhere closely onto the surface of the cooling drum by a static electricity method to cool and solidify the resin. In this way, an unstretched film having a thickness of 300 μm was produced.

The resultant unstretched sheet was raised in film-temperature through rolls heated to 120° C., and then stretched 5 times in the MD direction through rolls different from each other in peripheral speed to yield a monoaxially stretched film.

The application liquid A for forming the coating layer prepared by the above-mentioned method was applied onto the above-mentioned monoaxially stretched film by a reverse roll method, and then the resultant was dried. The application amount (coated amount) of the dried application liquid A for forming the coating layer was 0.1 $g/m^2$. After the application, the resultant film was led to a tenter, and grasped with clips to be TD-stretched. The carrying speed was set to 5 m/minute. The temperature in the zone 2 and the stretching ratio during stretching in the TD direction were set to 105° C. and 5 times, respectively. Next, in the zone 3, the workpiece was subjected to a heat treatment at 200° C. for 12 seconds, followed by a 5% relaxation treatment in the zone 4 at 190° C. Immediately thereafter, in the zone 5, end portions of the film were released from the clips at an in-process relaxation temperature of 190° C., and then workpiece was subjected to a relaxation treatment at a relaxation ratio of 4% in the machine direction to yield a polyester film. The physical properties of the resultant film are shown in Table 1.

The workpiece was stretched 5 times in the MD direction at a stretching temperature of 120° C. in the MD direction, and stretched 5 times in the TD direction at a stretching temperature of 105° C. in the TD direction, so that it was possible to heighten the heat fixation temperature up to 200° C. In the physical properties of the polyester film yielded at an in-process relaxation heat treatment temperature of 190° C. and a relaxation ratio of 4% in the machine direction, the heat shrinkage rate in the MD direction was 3.0%, and that in the TD direction was 1.2%. The breaking strength in the MD direction was 258 MPa, and that in the TD direction was 250 MPa. The plane orientation coefficient (ΔP) was 0.145. The oxygen permeability was 85 mL/m$^2$/day/MPa. Thus, the polyester film could be yielded with excellent heat resistant dimension stability, impact-resistant strength properties, easy-slipping properties, mechanical properties, transparency, and gas barrier performance.

Example 2

A polyester film was yielded in the same manner as in Example 1 except that the in-process relaxation heat treatment conditions were changed as shown in Table 1. The physical properties of the resultant film are shown in Table 1.

The workpiece was stretched 5 times in the MD direction at a stretching temperature of 120° C. in the MD direction, and stretched 5 times in the TD direction at a stretching temperature of 105° C. in the TD direction, so that it was possible to heighten the heat fixation temperature up to 200° C. In the physical properties of the polyester film yielded at an in-process relaxation heat treatment temperature of 180° C. and a relaxation ratio of 9% in the machine direction, the heat shrinkage rate in the MD direction was 2.0%, and that in the TD direction was 0.5%. The breaking strength in the MD direction was 249 MPa, and that in the TD direction was 247 MPa. The plane orientation coefficient (ΔP) was 0.141. The oxygen permeability was 85 mL/m$^2$/day/MPa. Thus, the polyester film could be yielded with excellent heat resistant dimension stability, impact-resistant strength properties, easy-slipping properties, mechanical properties, transparency, and gas barrier performance.

Example 3

Polyester films were yielded in the same manner as in Example 1 except that a method was used in which a cutting blade was set to the relaxation zone 5 and an end portion of the film was cut, thereby separating the film end portion. The physical properties of the resultant film are shown in Table 1.

Example 4

Polyester films were yielded in the same manner as in Example 2 except that a method was used in which a cutting blade was set to the relaxation zone 5 and an end portion of the film was cut, thereby separating the film end portion. The physical properties of the resultant film are shown in Table 1.

Example 5

The monoaxially stretched film which had an application layer formed thereon and which was yielded in Example 1 was led to a tenter, and grasped with clips to be TD-stretched. The carrying speed was set to 5 m/minute. The temperature in the zone 2 and the stretching ratio during stretching in the TD direction were set to 105° C. and 5 times, respectively. Next, in the zone 3, the workpiece was subjected to a heat treatment at 200° C. for 12 seconds, followed by a 5% relaxation treatment in the zone 4 at 190° C. Then, end portions of the film were released from the clips at the outlet position of the tenter, so that a polyester film intermediate was yielded. The polyester film intermediate was subjected to a relaxation treatment at a relaxation ratio of 4% in the MD direction in a dry furnace at 175° C. to yield a polyester film. The physical properties of the resultant film are shown in Table 1.

The workpiece is stretched 5 times in the MD direction at a temperature of 120° C. during stretching in the MD direction, and stretched 5 times in the TD direction at a temperature of 105° C. during stretching in the TD direction, so that it was possible to heighten the heat fixation temperature up to 200° C., and a polyester film intermediate can be yielded. In the physical properties of a polyester film yielded by subjecting the polyester intermediate to a relaxation treatment into 4% in the MD direction in the drying furnace of 175° C., the heat shrinkage rate in the MD direction was 2.8%, and that in the TD direction was 1.0%. The breaking strength in the MD direction was 258 MPa, and that in the TD direction was 250 MPa. The plane orientation coefficient (ΔP) was 0.144. The oxygen permeability was 85 mL/m$^2$/day/MPa. Thus, the polyester film could be yielded with excellent heat resistant dimension stability, impact-resistant strength properties, easy-slipping properties, mechanical properties, transparency, and gas barrier performance.

Example 6

A polyester film was yielded in the same manner as in Example 2 except that the heat fixation temperature was set to 180° C. and the relaxation treatment temperature was set to 170° C. The physical properties of the resultant film are shown in Table 1.

Examples 7 to 9

Polyester films were yielded in the same manner as in Example 1 except that the film-forming conditions were changed as shown in Table 1 without conducting the in-process relaxation treatment. The physical properties of the resultant films are shown in Table 1.

In Example 7, the stretching temperature was set to 110° C. in the MD direction, and the film was stretched 3.8 times in the MD direction; and the stretching temperature was set to 105° C. in the TD direction, and the film was stretched 4.5 times in the TD direction, so that the orientation of the molecular chains was weakened to such an extent that the film was not broken at a heat fixation temperature of 200° C. In the zone 4, the film was subjected to a relaxation treatment into 7.5% at 190° C. Thus, a polyester film was obtained. In the physical properties of the resultant polyester film, the plane orientation coefficient (ΔP) was 0.113, and the breaking strength in the MD direction was 163 MPa, and that in the TD direction was 158 MPa, both of which are relatively low. The heat shrinkage rate in the MD direction was 1.9%, and that in the TD direction was 0.6%.

In Example 8, the film was stretched 3.8 times in the MD direction at a temperature of 110° C. during stretching in the MD direction, and stretched 4.5 times in the TD direction at a temperature of 105° C. during stretching in the TD direction, so that the orientation of the molecular chains was weakened to such an extent that the film was not broken at a heat fixation temperature of 190° C. In the zone 4, the film was subjected to a relaxation treatment into 7.5% at 190° C. Thus, a polyester film was obtained. In the physical properties of the resultant polyester film, the plane orientation coefficient (ΔP) was 0.114, and the breaking strength in the MD direction was 214 MPa, and that in the TD direction was 237 MPa, both of which are relatively low. The heat shrinkage rate in the MD direction was 2.9%, and that in the TD direction was 0.5%.

In Example 9, the film was stretched 4.25 times in the MD direction at a temperature of 120° C. during stretching in the MD direction, and stretched 5 times in the TD direction at a temperature of 105° C. during stretching in the TD direction, so that the orientation of the molecular chains was weakened to such an extent that the film was not broken at a heat fixation temperature of 200° C. In the zone 4, the film was subjected to a relaxation treatment into 7.5% at 190° C. Thus, a polyester film was obtained. In the physical properties of the resultant polyester film, the plane orientation coefficient (ΔP) was 0.120, and the breaking strength in the MD direction was 221 MPa, and that in the TD direction was 219 MPa, both of which are relatively low. The heat shrinkage rate in the MD direction was 2.4%, and that in the TD direction was 0.8%.

Examples 10 to 13

Monoaxially stretched films were produced in the same manner as in Example 1 except that silica particles (SYLYSIA 310, manufactured by Fuji Silysia Chemical Ltd.) were used as an additive in a proportion of 2000 ppm. The resultant film was led to a tenter, grasped with clips, and then TD-stretched under conditions shown in Table 1 to yield a polyester film. The physical properties of the resultant films are shown in Table 1.

Comparative Example 1

A monoaxially stretched film produced in the same manner as in Example 1 was led to a tenter, and grasped with clips to be TD-stretched. The carrying speed was set to 5 m/minute. The temperature in the zone 2 and the stretching ratio during stretching in the TD direction were set to 105° C. and 5 times, respectively. Next, in the zone 3, the workpiece was subjected to a heat treatment at 200° C. for 12 seconds, followed by a 5% relaxation treatment in the zone 4 at 190° C., so that a polyester film intermediate was yielded. The physical properties of the resultant film are shown in Table 2.

Comparative Example 2

A polyester film was yielded in the same manner as in Comparative Example 1 except that the film-forming conditions were changed as shown in Table 2. The physical properties of the resultant film are shown in Table 2.

Comparative Example 3

A polyester film was yielded in the same manner as in Example 1 except that the in-process relaxation conditions were changed as shown in Table 2. The physical properties of the resultant film are shown in Table 2.

Comparative Example 4

A polyester film was yielded in the same manner as in Example 3 except that the in-process relaxation conditions were changed as shown in Table 2. The physical properties of the resultant film are shown in Table 2.

Comparative Example 5

In the same manner as in Comparative Example 2 except that the heat fixation temperature was changed to 200° C. and the relaxation temperature in TD Direction was changed to 190° C., an unstretched film was stretched. However, the film was broken in the heat fixation treatment step. Thus, a stretched film could not be yielded. In the case where the temperature during stretching in the MD direction and the stretching ratio in the MD direction were 120° C. and 2.5 times, respectively, and the temperature during stretching in the TD direction and the stretching ratio in the TD direction were 105° C. and 4.0 times, respectively, the film could not be withstood when the heat fixation temperature was set to 200° C. Consequently, the film was broken.

Comparative Example 6

As an additive, silica particles (SYLYSIA 310, manufactured by Fuji Silysia Chemical Ltd.) were used in a proportion of 2000 ppm, and a film was subjected to MD stretching and TD stretching under conditions shown in Table 2. However, the film was broken in the heat fixation step. Thus, a stretched film could not be yielded. In the case where the temperature during stretching in the MD direction and the stretching ratio in the MD direction were 110° C. and 3.4 times, respectively, and the temperature during stretching in the TD direction and the stretching ratio in the TD direction were 105° C. and 4.0 times, respectively, the film could not be withstood when the heat fixation temperature was set to 200° C. Consequently, the film was broken.

TABLE 1

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Stretching Ratio of MD Direction | (—) | 5 | 5 | 5 | 5 | 5 | 5 | 3.8 | 3.8 | 4.25 | 5 | 5 | 3.8 | 4.25 |
| Temperature during Stretching MD Direction | (° C.) | 120 | 120 | 120 | 120 | 120 | 120 | 110 | 110 | 120 | 120 | 120 | 110 | 120 |
| Stretching Ratio of TD Direction | (—) | 5 | 5 | 5 | 5 | 5 | 5 | 4.5 | 4.5 | 5 | 5 | 5 | 4.5 | 5 |
| Temperature during Stretching TD Direction | (° C.) | 105 | 105 | 105 | 105 | 105 | 105 | 105 | 105 | 105 | 105 | 105 | 105 | 105 |
| Heat Fixation Temperature | (° C.) | 200 | 200 | 200 | 200 | 200 | 180 | 190 | 190 | 200 | 200 | 200 | 190 | 200 |
| Relaxation Ratio during TD Relaxation Treatment | (%) | 5 | 5 | 5 | 5 | 5 | 5 | 7.5 | 7.5 | 7.5 | 5 | 5 | 7.5 | 7.5 |
| Temperature during TD Relaxation Treatment | (° C.) | 190 | 190 | 190 | 190 | 190 | 170 | 190 | 190 | 190 | 190 | 190 | 190 | 190 |
| In-process Relaxation Temperature | (° C.) | 190 | 180 | 190 | 180 | — | 170 | — | — | — | 180 | 190 | — | — |
| Relaxation Ratio in the Machine Direction | (—) | 4 | 9 | 4 | 9 | — | 9 | — | — | — | 9 | 4 | — | — |
| Annealing Temperature | (° C.) | — | — | — | — | 175 | — | — | — | — | — | — | — | — |
| Speed Ratio | (—) | — | — | — | — | 4 | — | — | — | — | — | — | — | — |
| Breaking Strength MD | (MPa) | 258 | 249 | 258 | 249 | 258 | 235 | 214 | 214 | 221 | 249 | 258 | 214 | 221 |
| Breaking Strength TD | (MPa) | 250 | 247 | 250 | 247 | 250 | 220 | 237 | 237 | 219 | 247 | 250 | 237 | 219 |
| Breaking Elongation MD | (%) | 51 | 55 | 51 | 55 | 51 | 51 | 117 | 117 | 96 | 55 | 51 | 117 | 96 |
| Breaking Elongation TD | (%) | 52 | 56 | 52 | 56 | 52 | 49 | 95 | 95 | 81 | 56 | 52 | 95 | 81 |
| Refractive Index Nx | (—) | 1.6282 | 1.6234 | 1.6279 | 1.6231 | 1.6272 | 1.6302 | 1.6063 | 1.6062 | 1.6218 | 1.6234 | 1.6279 | 1.6062 | 1.6218 |
| Refractive Index Ny | (—) | 1.6233 | 1.6214 | 1.6235 | 1.6217 | 1.6235 | 1.6198 | 1.6244 | 1.6240 | 1.6130 | 1.6214 | 1.6235 | 1.6240 | 1.6130 |
| Refractive Index Nz | (—) | 1.4805 | 1.4812 | 1.4808 | 1.4808 | 1.4811 | 1.4840 | 1.5023 | 1.5016 | 1.4975 | 1.4812 | 1.4808 | 1.5016 | 1.4975 |
| Plane Orientation Coefficient (ΔP) | (—) | 0.145 | 0.141 | 0.145 | 0.142 | 0.144 | 0.142 | 0.113 | 0.114 | 0.120 | 0.141 | 0.145 | 0.114 | 0.120 |
| Heat Shrinkage Rate MD | (%) | 3.0 | 2.0 | 3.1 | 2.1 | 2.8 | 2.8 | 1.9 | 2.9 | 2.4 | 2.0 | 3.1 | 2.9 | 2.4 |
| Heat Shrinkage Rate TD | (%) | 1.2 | 0.5 | 0.8 | 0.6 | 1.0 | 1.1 | 0.6 | 0.5 | 0.8 | 0.5 | 0.8 | 0.5 | 0.8 |
| Coefficient of Static Friction (μs) | (—) | 0.54 | 0.54 | 0.54 | 0.54 | 0.54 | 0.54 | 0.54 | 0.54 | 0.54 | 0.38 | 0.38 | 0.38 | 0.38 |
| Coefficient of Dynamic Friction (μd) | (—) | 0.52 | 0.52 | 0.52 | 0.52 | 0.52 | 0.52 | 0.52 | 0.52 | 0.52 | 0.44 | 0.44 | 0.44 | 0.44 |
| Impact Strength | (J) | 1.2 | 1.2 | 1.2 | 1.2 | 1.2 | 1.3 | 0.5 | 0.6 | 0.8 | 1.2 | 1.2 | 0.7 | 1.0 |
| Impact Strength @15 μm | (J) | 0.3 | 0.3 | 0.3 | 0.3 | 0.3 | 0.3 | 0.6 | 0.4 | 0.4 | 6.8 | 6.8 | 6.8 | 6.8 |
| Haze | (%) | 89.1 | 89.1 | 89.1 | 89.1 | 89.1 | 89.1 | 88.7 | 89.1 | 88.9 | 88 | 88.2 | 88.5 | 88.2 |
| Total Light Transmittance | (%) | 15.5 | 15.5 | 15.5 | 15.5 | 15.5 | 15.5 | 24.3 | 23.9 | 19.8 | 15.5 | 15.5 | 23.9 | 19.8 |
| Thickness @50 μm Measured Value | (μm) | 85 | 85 | 85 | 85 | 85 | 88 | 66 | 63 | 71 | 85 | 85 | 63 | 71 |
| Oxygen Permeability @50 μm | (mL/m²/day/MPa) | 26.4 | 26.4 | 26.4 | 26.4 | 26.4 | 27.3 | 32.1 | 30.1 | 28.0 | 26.4 | 26.4 | 30.1 | 28.0 |
| Oxygen Permeability Measured Value | (mL/m²/day/MPa) | 10.8 | 10.8 | 10.8 | 10.8 | 10.8 | 11.0 | 8.4 | 8.2 | 9.1 | 10.8 | 10.8 | 8.2 | 9.1 |
| Water Vapor Permeability @50 μm | (g/m²/day) | 3.3 | 3.3 | 3.3 | 3.3 | 3.3 | 3.4 | 4.1 | 3.9 | 3.6 | 3.3 | 3.3 | 3.9 | 3.6 |
| Water Vapor Permeability Measured Value | (g/m²/day) | 0.7 | 0.7 | 0.7 | 0.7 | 0.7 | 0.7 | 0.7 | 0.7 | 0.7 | 0.7 | 0.7 | 0.7 | 0.7 |
| Intrinsic Viscosity | (dL/g) | A | A | A | A | A | A | A | A | A | A | A | A | A |
| Oxygen Permeability Test for Packing Container | | A | A | A | C | A | A | A | A | A | A | A | A | A |
| Model Test for Thermal Processing | | A | A | C | C | A | A | A | A | A | A | C | A | A |
| Film-Formation Stability Evaluation | | B | B | B | B | B | B | B | B | B | A | A | A | A |
| Appearance of Polyester Film Roll | | | | | | | | | | | | | | |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Stretching Ratio of MD Direction | (—) | 5 | 2.5 | 5 | 5 | 2.5 | 3.4 |
| Temperature during Stretching MD Direction | (° C.) | 120 | 120 | 120 | 120 | 120 | 110 |
| Stretching Ratio of TD Direction | (—) | 5 | 4 | 5 | 5 | 4 | 4 |
| Temperature during Stretching TD Direction | (° C.) | 105 | 105 | 105 | 105 | 105 | 105 |
| Heat Fixation Temperature | (° C.) | 200 | 120 | 200 | 200 | 200 | 200 |
| Relaxation Ratio during TD Relaxation Treatment | (%) | 5 | 5 | 5 | 5 | 5 | 5 |
| Temperature during TD Relaxation Treatment | (° C.) | 190 | 110 | 190 | 190 | 190 | 190 |
| In-process Relaxation Temperature | (° C.) | — | — | 190 | 190 | — | — |
| Relaxation Ratio in the Machine Direction | (—) | — | — | 0.5 | 0.5 | — | — |
| Annealing Temperature | (° C.) | — | — | — | — | — | — |
| Speed Ratio | (—) | — | — | — | — | — | — |
| Breaking Strength MD | (MPa) | 260 | 104 | 258 | 258 | the film was broken | the film was broken |
| TD | (MPa) | 255 | 114 | 254 | 254 |  |  |
| Breaking Elongation MD | (%) | 47 | 245 | 48 | 48 |  |  |
| TD | (%) | 42 | 165 | 43 | 43 |  |  |
| Refractive Index Nx | (—) | 1.6292 | 1.5643 | 1.6288 | 1.6288 |  |  |
| Ny | (—) | 1.6242 | 1.5694 | 1.6241 | 1.6241 |  |  |
| Nz | (—) | 1.4801 | 1.5522 | 1.4799 | 1.4799 |  |  |
| Plane Orientation Coefficient ($\Delta$P) | (—) | 0.147 | 0.014 | 0.147 | 0.147 |  |  |
| Heat Shrinkage Rate MD | (%) | 4.3 | 41 | 4.5 | 4.5 |  |  |
| TD | (%) | 4.3 | 61 | 4.6 | 4.6 |  |  |
| Coefficient of Static Friction ($\mu$s) | (—) | 0.54 | 0.54 | 0.54 | 0.54 |  |  |
| Coefficient of Dynamic Friction ($\mu$d) | (—) | 0.52 | 0.52 | 0.52 | 0.52 |  |  |
| Impact Strength @15 μm | (J) | 1.2 | 0.05 | 1.2 | 1.2 |  |  |
| Haze | (%) | 0.3 | 0.4 | 0.3 | 0.3 |  |  |
| Total Light Transmittance | (%) | 89.1 | 90.4 | 89.1 | 89.1 |  |  |
| Thickness | (μm) | 15.5 | 29 | 15.5 | 15.5 |  |  |
| Oxygen Permeability Measured Value | (mL/m$^2$/day/MPa) | 85 | 93.7 | 85 | 85 |  |  |
| @50 μm | (mL/m$^2$/day/MPa) | 26.4 | 54.0 | 26.4 | 26.4 |  |  |
| Water Vapor Permeability Measured Value | (g/m$^2$/day) | 10.8 | 13.5 | 10.8 | 10.8 |  |  |
| @50 μm | (g/m$^2$/day) | 3.3 | 7.8 | 3.3 | 3.3 |  |  |
| Intrinsic Viscosity | (dL/g) | 0.7 | 0.7 | 0.7 | 0.7 |  |  |
| Oxygen Permeability Test for Packing Container |  | A | A | A | A |  |  |
| Model Test for Thermal Processing |  | B | C | B | B |  |  |
| Film-Formation Stability Evaluation |  | A | B | A | C |  |  |
| Appearance of Polyester Film Roll |  | B | B | B | B |  |  |

INDUSTRIAL APPLICABILITY

The polyester film of the present invention is excellent in thermal dimension stability and easy-slipping properties, and is also excellent in impact-resistant strength properties. Thus, the polyester film can provide a material for, e.g., foods, medicines, and electronic elements, or a gas blocking material.

DESCRIPTION OF REFERENCE SIGNS

1: Pre-heating zone
2: Transverse stretching zone
3: Heat fixation zone
4: Relaxation zone
5: Relaxation zone
6: Cooling zone
7: Clips

The invention claimed is:

1. A polyester film comprising at least one layer mainly including a polyester resin containing a dicarboxylic acid component including furandicarboxylic acid as a main component and a glycol component including ethylene glycol as a main component; and having a plane orientation coefficient $\Delta$P of not less than 0.005 and not more than 0.200, a thickness of not less than 1 μm and not more than 300 μm, a heat shrinkage rate of 3.2% or less in each of the MD direction and the TD direction at 150° C. for 30 minutes, and a layer containing at least one additive.

2. The polyester film according to claim 1, wherein the plane orientation coefficient $\Delta$P is not less than 0.100 and not more than 0.160.

3. The polyester film according to claim 2, wherein the additive is fine particles.

4. The polyester film according to claim 3, which has an impact strength calculated in 15 μm equivalent of 0.4 J or more.

5. The polyester film according to claim 2, which has an impact strength calculated in 15 μm equivalent of 0.4 J or more.

6. The polyester film according to claim 1, wherein the additive is fine particles.

7. The polyester film according to claim 6, which has an impact strength calculated in 15 μm equivalent of 0.4 J or more.

8. The polyester film according to claim 1, which has an impact strength calculated in 15 μm equivalent of 0.4 J or more.

9. A polyester film roll obtained by winding up the polyester film according to claim 1.

10. A polyester film roll obtained by winding up the polyester film according to claim 2.

11. A polyester film roll obtained by winding up the polyester film according to claim 3.

12. A polyester film roll obtained by winding up the polyester film according to claim 4.

13. A polyester film roll obtained by winding up the polyester film according to claim 6.

14. A polyester film roll obtained by winding up the polyester film according to claim 8.

15. A method for producing the polyester film according to claim 1, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

16. A method for producing the polyester film according to claim 2, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

17. A method for producing the polyester film according to claim 3, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

18. A method for producing the polyester film according to claim 4, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

19. A method for producing the polyester film according to claim 6, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

20. A method for producing the polyester film according to claim 8, the method comprising the step of:
stretching an unstretched film in a mechanical direction and a transverse direction, passing the film through a highest-temperature part in a heat fixation treatment, and separating an end portion of the film immediately after the film has been passed through the highest-temperature part; and the step of:
subjecting the resultant film to a relaxation heat treatment in the mechanical direction and the transverse direction.

\* \* \* \* \*